United States Patent
Momcilovic et al.

(10) Patent No.: US 11,232,595 B1
(45) Date of Patent: Jan. 25, 2022

(54) THREE-DIMENSIONAL ASSEMBLY FOR MOTION CAPTURE CALIBRATION

(71) Applicant: Weta Digital Limited, Wllington (NZ)

(72) Inventors: Dejan Momcilovic, Wellington (NZ); Jake Botting, Wellington (NZ)

(73) Assignee: WETA DIGITAL LIMITED, Wellington (NZ)

(*) Notice: Subject to any disclaimer, the term of this patent is extended or adjusted under 35 U.S.C. 154(b) by 0 days.

(21) Appl. No.: 17/461,379

(22) Filed: Aug. 30, 2021

Related U.S. Application Data

(60) Provisional application No. 63/075,769, filed on Sep. 8, 2020, provisional application No. 63/237,510, filed on Aug. 26, 2021.

(51) Int. Cl.
| | |
|---|---|
| *G06T 7/80* | (2017.01) |
| *G06T 7/73* | (2017.01) |
| *H04N 5/225* | (2006.01) |
| *H04N 17/00* | (2006.01) |
| *H04N 5/247* | (2006.01) |

(52) U.S. Cl.
CPC .............. *G06T 7/80* (2017.01); *G06T 7/74* (2017.01); *H04N 5/2253* (2013.01); *H04N 5/247* (2013.01); *H04N 17/002* (2013.01); *G06T 2207/30208* (2013.01)

(58) Field of Classification Search
CPC ... G06T 7/80; G06T 7/74; G06T 2207/30208; H04N 5/247; H04N 17/002; H04N 5/2253
See application file for complete search history.

(56) References Cited

U.S. PATENT DOCUMENTS

| | | | | |
|---|---|---|---|---|
| 6,081,336 A | * | 6/2000 | Messner | ............ G02B 21/0012 |
| | | | | 250/559.29 |
| 2003/0004694 A1 | | 1/2003 | Aliaga et al. | |
| 2004/0155962 A1 | | 8/2004 | Marks | |
| 2004/0178955 A1 | | 9/2004 | Menache et al. | |
| 2005/0017968 A1 | | 1/2005 | Wurmlin et al. | |
| 2012/0330601 A1 | | 12/2012 | Soubra et al. | |
| 2015/0170416 A1 | | 6/2015 | McGregor et al. | |
| 2016/0335782 A1 | | 11/2016 | Sundaresan et al. | |
| 2016/0364867 A1 | | 12/2016 | Moteki et al. | |
| 2017/0136626 A1 | | 5/2017 | Wang et al. | |
| 2017/0243374 A1 | * | 8/2017 | Matsuzawa | ............ G01B 11/00 |
| 2017/0274281 A1 | * | 9/2017 | Vandonkelaar | ......... G06T 7/246 |

(Continued)

*Primary Examiner* — Michael E Teitelbaum
(74) *Attorney, Agent, or Firm* — Trellis IP Law Group, PC

(57) ABSTRACT

Implementations facilitate the calibration of cameras in a live action scene. In some implementations, a system includes a base, where the base is configured to removably couple to a camera in the live action scene. The system further includes a plurality of extensions coupled to the base, where the plurality of extensions extends outwardly away from the base. The system further includes a plurality of reference points identifiable by a sensor, where the reference points are coupled to ends of corresponding extensions of the plurality of extensions, and where the plurality of extensions positions the plurality of reference points in a three-dimensional arrangement. Distances between pairs of reference points are based on one or more aspects of the extensions, and the distances between the pairs of reference points are used to compute reference point data generated from a performance capture system.

20 Claims, 21 Drawing Sheets

(56) References Cited

U.S. PATENT DOCUMENTS

| | | |
|---|---|---|
| 2018/0184998 A1 | 7/2018 | Nyholm et al. |
| 2019/0037207 A1 | 1/2019 | Brockers et al. |
| 2019/0206084 A1 | 7/2019 | Noble et al. |
| 2019/0221003 A1 | 7/2019 | Zhou et al. |
| 2020/0011668 A1 | 1/2020 | Derhy et al. |
| 2020/0394821 A1 | 12/2020 | Huang et al. |

* cited by examiner

700

THREE-DIMENSIONAL ASSEMBLY FOR MOTION CAPTURE CALIBRATION

CROSS-REFERENCE TO RELATED APPLICATIONS

This application claims priority from U.S. Provisional Patent Application No. 63/075,769, entitled MOTION CAPTURE CALIBRATION USING A THREE-DIMENSIONAL ASSEMBLY, filed Sep. 8, 2020 (WD0092PP1), and from U.S. Provisional Patent Application No. 63/237,510, entitled A THREE-DIMENSIONAL ASSEMBLY FOR MOTION CAPTURE CALIBRATION, filed Aug. 26, 2021 (WD0092PP2), which are hereby incorporated by reference as if set forth in full in this application for all purposes.

This application is related to U.S. patent application Ser. No. 17/185,935, entitled MOTION CAPTURE CALIBRATION USING A THREE-DIMENSIONAL ASSEMBLY, filed on Feb. 25, 2021 (WD0092US1), which is hereby incorporated by reference as if set forth in full in this application for all purposes.

BACKGROUND

Many visual productions (e.g., movies, videos, clips, and recorded visual media) include combinations of real and digital images to create animation and special effects that form an illusion of being integrated with live action. For example, a visual production may include a live actor in a location shoot appearing in a scene with a computer-generated ("CG," "virtual," or "digital") character. It is desirable to produce seemingly realistic visual productions by compositing CG items with the live action items. Often, several types of cameras are used on a set, where each camera provides different data, such as images of the live action scene, depth information, tracking of markers in a live action scene, etc. It is necessary to calibrate the various camera data in real-time to accurately composite the live action elements with CG images and produce a realistic looking visual production.

SUMMARY

Implementations generally relate to the calibration of cameras in a live action scene. Implementations provide for automated calibration of cameras in a live action scene using reference points in images captured by the cameras. In various implementations, a system includes a base, where the base is configured to removably couple to a camera in the live action scene. The system further includes a plurality of extensions coupled to the base, where the plurality of extensions extends outwardly away from the base. The system further includes a plurality of reference points identifiable by a sensor, where the reference points are coupled to ends of corresponding extensions of the plurality of extensions, and where the plurality of extensions positions the plurality of reference points in a three-dimensional arrangement. Distances between pairs of reference points are based on one or more aspects of the extensions, and the distances between the pairs of reference points are used to compute reference point data generated from a performance capture system.

DETAILED DESCRIPTION OF IMPLEMENTATIONS

Implementations facilitate the calibration of cameras in a live action scene. In some implementations, an automated system calibrates cameras in a live action scene using reference points in images captured by the cameras. This calibration may be referred to as motion capture (MoCap) calibration. Implementations described herein enable the system to provide a calibrated multiview vision system for tracking reference points, which may include active and/or passive reference markers.

In various implementations, a system includes a base, where the base is configured to removably couple to a camera in the live action scene. The system further includes a plurality of extensions coupled to the base, where the plurality of extensions extends outwardly away from the base. The system further includes a plurality of reference points identifiable by a sensor, where the reference points are coupled to ends of corresponding extensions of the plurality of extensions. In various implementations, the plurality of extensions positions the plurality of reference points in a three-dimensional arrangement. In various implementations, distances between pairs of reference points are based on one or more aspects of the extensions, and the distances between the pairs of reference points are used to compute reference point data generated from a performance capture system.

Figure 1:
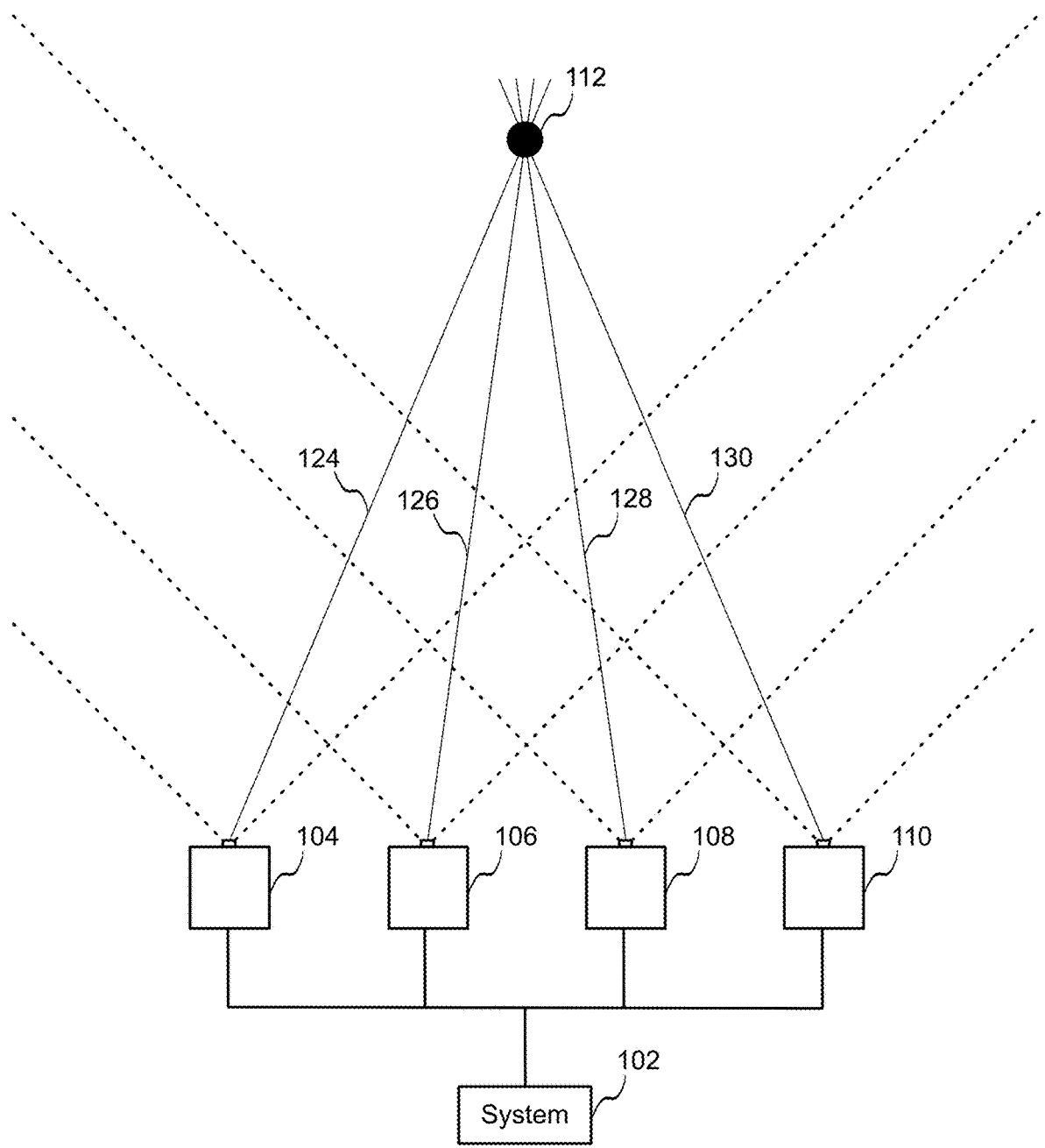
FIG. 1 is a block diagram of an example environment for calibrating cameras in a live action scene, which may be used for implementations described herein.

FIG. 1 is a block diagram of an example environment 100 for calibrating cameras in a live action scene, which may be used for implementations described herein. Shown is a system 102, cameras 104, 106, 108, and 110, and reference point 112. As described in more detail below, system 102 receives videos including images from multiple cameras such as cameras 104-110. In various implementations, cameras 104-110 and/or other sensors are configured to identify reference points or markers. As described in more detail herein, system 102 utilizes cameras 104-110 to locate, identify, and track the reference points such as reference markers on the live action scene or set. In various example implementations, reference points may be also referred to as reference markers. Implementations described herein calibrate cameras 104-110, which improve the accuracy of system 102 locating and tracking reference points.

Each of cameras 104-110 has a field of view (indicated by dotted lines) that enables each camera to capture video and/or images of objects in a live action scene. In various implementations, cameras 104-110 are stationary at the point of their calibration until they need to be moved for subsequent scene changes. Cameras 104-110 may be attached to tripods or other camera stabilizing equipment. In various implementations, the positions of and orientations of cameras 104-110 may vary, and will depend on the particular implementation.

In various implementations, if a particular camera is moved (e.g., used in another location of the set, used in another set, etc.), that camera may then recapture reference point 112 and/or capture and collect other reference points. System 102 may then recalculate the new position of the camera.

Cameras 104-110 may be any suitable cameras, including cameras dedicated to tracking reference points (e.g., active reference markers, passive reference markers, etc.). Such cameras may also include infrared cameras and other digital cameras. In some implementations where a reference point is an active reference marker, the reference marker emits an infrared light. At least some cameras may have a narrow-pass filter to detect and capture the infrared light, which system 102 analyzes to compute the location of the active reference marker. Active reference markers described herein may emit various different types of signals (e.g., visible light, infrared light, etc.), depending on the particular implementation. Such an active reference marker may be used to implement any one or of reference points described herein. Passive reference markers may include colored balls. A variety of colored balls (e.g., yellow, orange, blue, red, green, etc.) may be used in different combinations, depending on the particular implementation. In various implementations, different colors of the balls may have different associations. For example, some colors may be associated with particular predetermined persons or objects, etc. Some colors may be associated with particular predetermined portions of objects or persons, etc.

In various implementations, objects may include scene props and actors, and these objects may have reference points such as reference point 112 attached to them for tracking live action tracking purposes. In various implementations, the reference points may be any type of reference or position that system 102 identifies using any suitable approach and techniques. Such techniques may vary and the particular techniques used will depend on the particular implementation. For example, system 102 may use techniques involving image recognition, pattern recognition, reference markers, radio-frequency identification (RFID), wireless beacons, etc.

As described in more detail herein, system 102 causes cameras 104-110 to project respective rays 124, 126, 128, and 130 into the space and through reference point 112. For ease of illustration, one reference point 112 is shown. The particular number of reference points in a given live action scene may vary and will depend on the implementation. For example, there may be tens or hundreds of reference points on a given live action scene. In some implementations, system 102 may cause cameras 104-110 to also project other respective rays into the space and through other reference points.

In various implementations, system 102 associates each reference point in a given image with a ray from each camera of a set of different cameras that capture such reference points in their respective image(s). System 102 searches for and identifies intersections of rays 124-130 to identify particular reference points. In various implementations, system 102 analyzes information associated with each intersection to identify the respective reference point, respective rays that intersect the reference point, and respective cameras associated with such rays.

Rays 124-130 may also be referred to as epipolar lines 124-130. Each epipolar line 124-130 is a straight line of intersection in an epipolar plane, where each epipolar line 124-130 represents a different point of view of a respective camera. In various scenarios, there may be tens of cameras that capture tens or hundreds of reference points. In various scenarios, system 102 may perform thousands or millions of calculations to analyze different intersections associated with different references points in a live action scene.

As system 102 locates the different reference points such as reference point 112 based on the epipolar lines 124-130, system 102 computes or solves for the 3D coordinates and orientation of each of cameras 104-110. Such epipolar geometry describes the relationships between different cameras 104-110, including their respective points of view.

For ease of illustration, one system 102 and four cameras 104-110 are shown. System 102 may represent multiple systems, and cameras 104-110 may represent any number of cameras. In other implementations, environment 100 may not have all of the components shown and/or may have other elements including other types of elements instead of, or in addition to, those shown herein.

While system 102 performs implementations described herein, in other implementations, any suitable component or combination of components associated with system 102 or any suitable processor or processors associated with system 102 may facilitate performing the implementations described herein. Various example implementations directed to environment 100 for calibrating cameras 104-110 are described in more detail herein.

Figure 2:
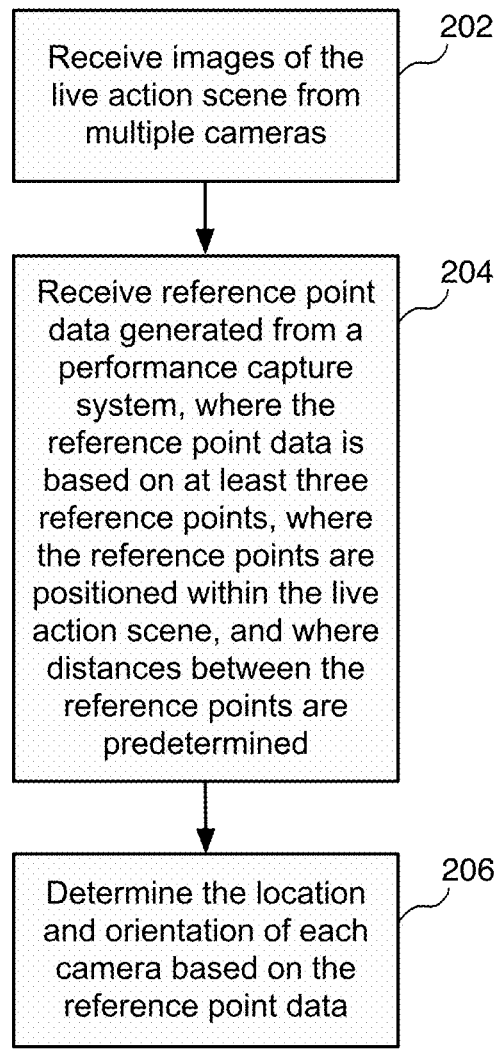
FIG. 2 is an example flow diagram for calibrating cameras in a live action scene, according to some implementations.

FIG. 2 is an example flow diagram for calibrating cameras in a live action scene, according to some implementations. Referring to both FIGS. 1 and 2, a method is initiated at block 202, where a system such as system 102 receives images of the live action scene from multiple cameras. Example implementations of such images are described in more detail below in connection with FIG. 3. Subsequent steps of FIG. 2 are described below in connection with FIG. 3.

Figure 3:
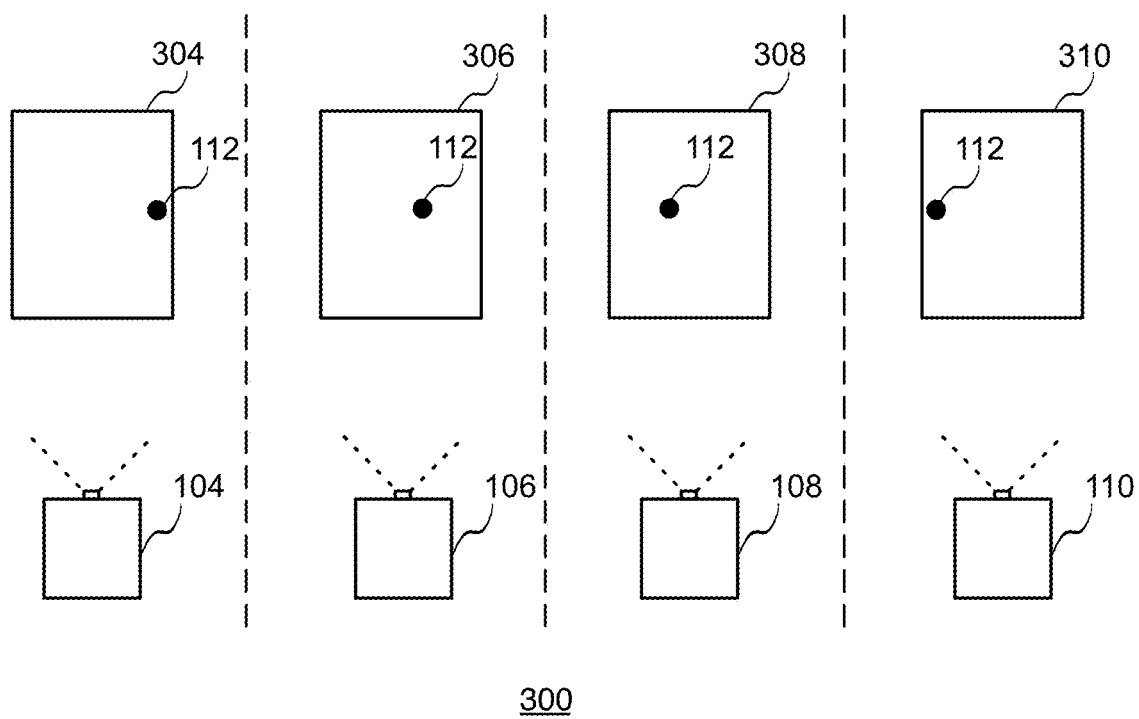
FIG. 3 is a block diagram of an example scenario including a reference point captured by cameras in a live action scene, according to some implementations.

FIG. 3 is a block diagram of an example scenario 300 including a reference point captured by cameras in a live action scene, according to some implementations. Shown are cameras 104, 106, 108, and 110, each of which are capturing respective images 304, 306, 308, and 310 of reference point 112. While one reference point 112 is shown, the number of reference points captured by a given camera may vary, and the number will depend on the particular implementation.

As shown, images 304-310 show reference point 112 in a different location in the different image frames depending on the relative location of reference point 112 to the respective camera in the physical live action scene. In various implementations, system 102 sends images 304-310 to a performance capture system, which may be remote to system 102 or integrated with system 102.

In various implementations, cameras 104-110 have a known projection matrix for mapping reference points in three-dimensions (3D) to two-dimensional (2D) points in an image. In various implementations, system 102 identifies reference point 112 in 2D in an image frame from 3D in the live action scene. System 102 then causes each camera to project a ray into the space and through reference point 112 and/or other references points in the image. As such, all the cameras see the same reference point 112 in a different place in their respective 2D image frame. As shown, cameras 104-110 see the same reference point 112 but in different positions in their respective image frame. The rays projected by the different cameras 104-110 intersect at reference point 112 in the 3D space, and system 102 computes these intersections.

As indicated above, while some implementations are described herein in the context of a single reference point, these implementations and others also apply to multiple reference points. For example, in various implementations, each camera may capture 3 reference points attached to a wand. System 102 may analyze each reference point individually and together as a group, including their relative positions from each other. Further examples of such implementations are described in more detail herein.

Referring again to FIG. 2, at block 204, system 102 receives reference point data generated from a performance capture system. The reference point data may be based on at least reference point 112. For ease of illustration, as indicated above, one reference point 112 is shown for the calibration of cameras 104-110. There may any number of reference points used for the calibration of cameras 104-110. For example, in various implementations, the reference point data is based on at least three reference points in the live action scene. In various implementations, the distances between the reference points are predetermined. Example implementations directed to the distances between the reference points are described in more detail herein. In various implementations, the three reference points are arranged in a predetermined pattern. In various implementations, the three reference points are attached to one or more moveable forms. In various implementations, the three reference points are attached to a predetermined form. For example, such a predetermined form may be a rigid mobile form such as a wand, etc., which a person can carry and place in the live action scene. Example implementations directed to the calibration of cameras using multiple reference points arranged in a predetermined pattern and attached to a predetermined form are described below in connection with FIGS. 4-9.

At block 206, system 102 determines the location and orientation of each camera based on the reference point data. In various implementations, the locations of the at least three reference points in the live action scene are determinable, as described in various implementations described herein. In various implementations, system 102 may determine extrinsic information and intrinsic information. In various implementations, the location and orientation of the cameras may be referred to as extrinsic information. In various implementations, other camera information or attributes such as lens focal length may be referred to camera intrinsic information. For example, while system 102 may determine the location and orientation of a given camera (extrinsic information), system 102 may also determine the lens focal length of the camera. As described in more detail herein, system 102 may utilize the wand described in FIG. 4 to determine extrinsic information (e.g., location, orientation, etc.). System 102 may also utilize the tiara described in FIG. 7 to determine extrinsic information (e.g., location, orientation, etc.) and/or intrinsic information (e.g., lens focal length, etc.).

In various implementations, in addition to system 102 determining a location and orientation of each camera based on the reference point data, system 102 may also determine the location and orientation of each camera based on any one or more location techniques. For example, in some implementations, system 102 may triangulate each camera of the set of cameras based on the reference point data. In various implementations, to triangulate each camera, system 102 locates the reference points in one or more images of the images. System 102 then computes an aspect ratio of multiple reference points in the one or more images. In implementations where system 102 analyzes a group of 3 reference points on a wand, for example. Example implementations directed to a wand with reference points are described below in connection with FIG. 4. In various implementations, system 102 computes the aspect ratio of the three reference points in the one or more images. System 102 then triangulates each camera based on the aspect ratio. System 102 determines the location of each camera based on relative angles to each reference point in the reference point data.

In some implementations, system 102 may perform trilateration on each camera of the set of cameras based on the reference point data. In various implementations, to perform a trilateration on each camera, system 102 locates the reference points in one or more images of the images. System 102 then computes an aspect ratio of multiple reference points in the one or more images. In various implementations, system 102 may analyze a group of 3 reference points on a wand, for example. In various implementations, system 102 computes the aspect ratio of the three reference points in the one or more images. System 102 then performs trilateration on each camera based on the aspect ratio. System 102 determines the location of each camera based on relative distances to each reference point in the reference point data.

In various implementations, the calibration process uses the camera stereo and wand to determine the volumetric position. Furthermore, in various implementations, the system may utilize feedback as part of the calibration. For example, in some implementations, the system may utilize one or more phase-locked loop (PLL) techniques, where once calibrated, the system may track any changes to camera locations.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 4:
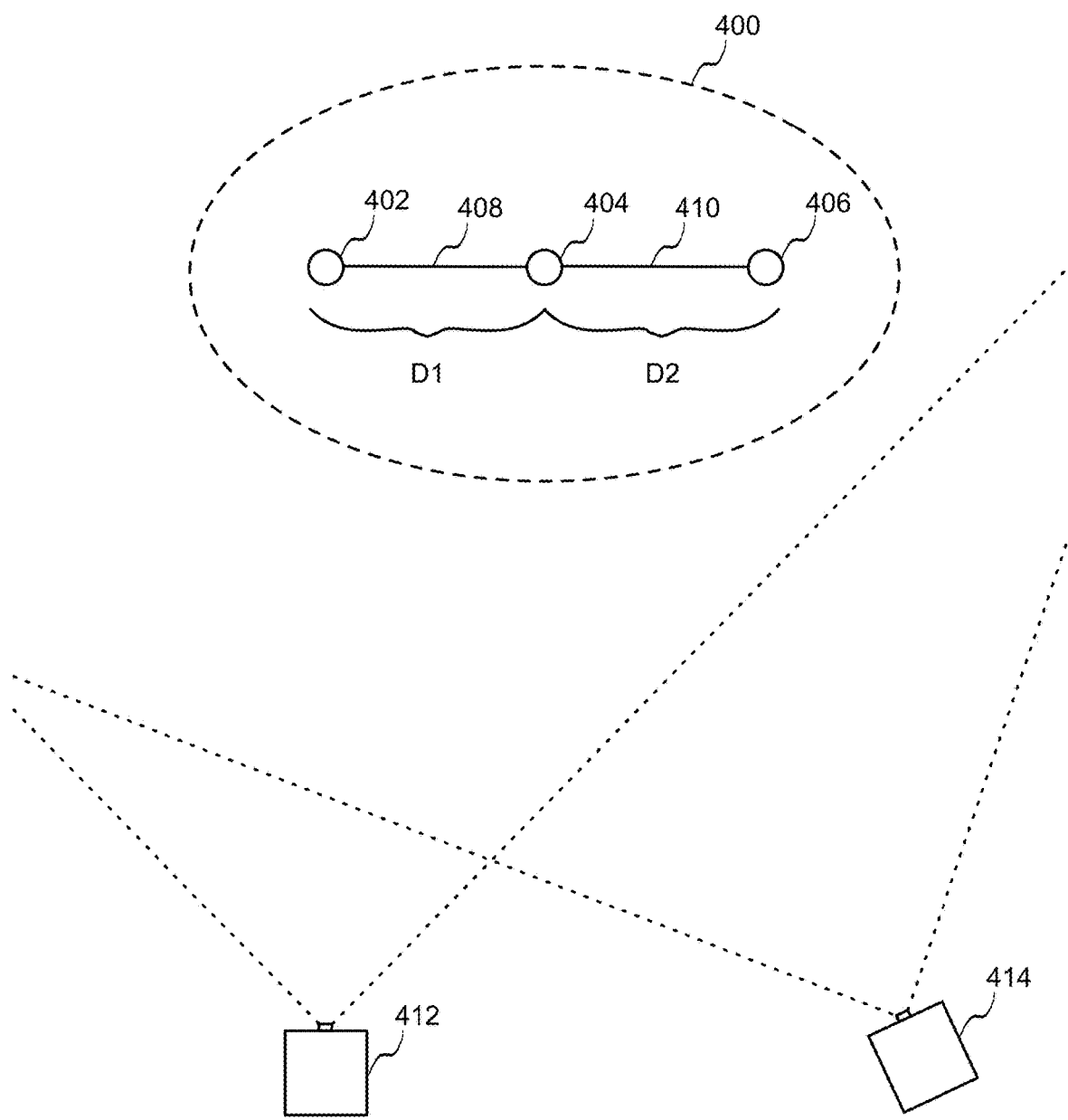
FIG. 4 is a block diagram of a group of reference points in a live action scene, where the reference points are arranged in a straight line, according to some implementations.

FIG. 4 is a block diagram of a group 400 of reference points in a live action scene, where the reference points are arranged in a straight line, according to some implementations. As shown, group 400 includes reference points 402, 404, and 406. In various implementations, reference points 402, 404, and 406 form a straight line. In some implementations, reference points 402, 404, and 406 may be symmetrical, as shown. In some implementations, reference points 402, 404, and 406 may be asymmetrical. For example, the distance between reference points 402 and 404 may be different from the distance between reference points 404 and 406. Example implementations directed to the distances between the references points are described in more detail herein.

In various implementations, reference points 402, 404, and 406 are attached to a rigid form. For example, in the example implementation shown, reference points 402, 404, and 406 are attached to respective rigid arms 408 and 410, which form a straight line of a wand. As such, group 400 of reference points may also be referred to as wand 400. In various implementations, the rigid form is a rigid mobile form such as wand 400, where a person may walk rigid form onto the set of the live action seen and place the rigid mobile form in the live action scene. As such various cameras may capture reference points 402, 404, and 406 in images for calibration. In some implementations, the rigid mobile form may be left in the live action scene for subsequent calibration (e.g., calibration of cameras added to the live action scene, recalibration of cameras moved in the live action scene, etc.). While three reference points 402, 404, and 406 are shown, the number of reference points on wand 400 may vary, and the number will depend on the particular implementation. For example, there may be 4 references points or 5 reference points, etc., attached to wand 400.

In various implementations, reference points 402, 404, and 406 of wand 400 are determinable, known, or predetermined, and their distances from each other are invariant or fixed (e.g., do not change). In other words, the absolute length of wand 400 is known, including distances D1 and D2. In the example shown, in various implementations, reference points 402, 404, and 406 of wand 400 are equidistant, were the distance D1 between reference point 402 and reference point 404 is substantially equal to the distance D2 between reference point 404 and reference point 406.

In some implementations, system 102 collects thousands frames from cameras 412 and 414 for one calibration of these cameras. In some implementations, system 102 may analyze the reference points of wand 400 at different locations and orientations in the live action scene in order to optimize calibration measurements. In various implementations, by having at least three reference markers 402-406, system 102 can accurately compute the orientation of wand 400 regardless of its relative orientation to a given camera.

Figure 5:
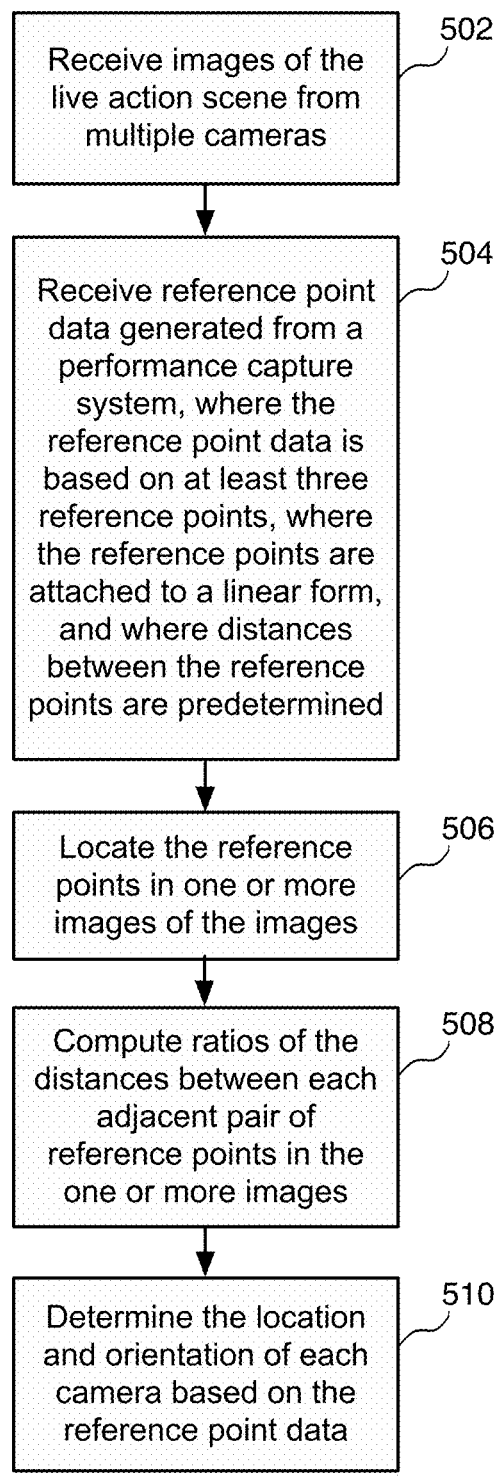
FIG. 5 is an example flow diagram for calibrating cameras in a live action scene, according to some implementations.

FIG. 5 is an example flow diagram for calibrating cameras in a live action scene, according to some implementations. Referring to both FIGS. 1, 4, and 5, a method is initiated at block 502, where a system such as system 102 receives images of the live action scene from multiple cameras. Example implementations of such images are described in more detail below in connection with FIG. 6. Subsequent steps of FIG. 5 are described below in connection with FIG. 6.

Figure 6:
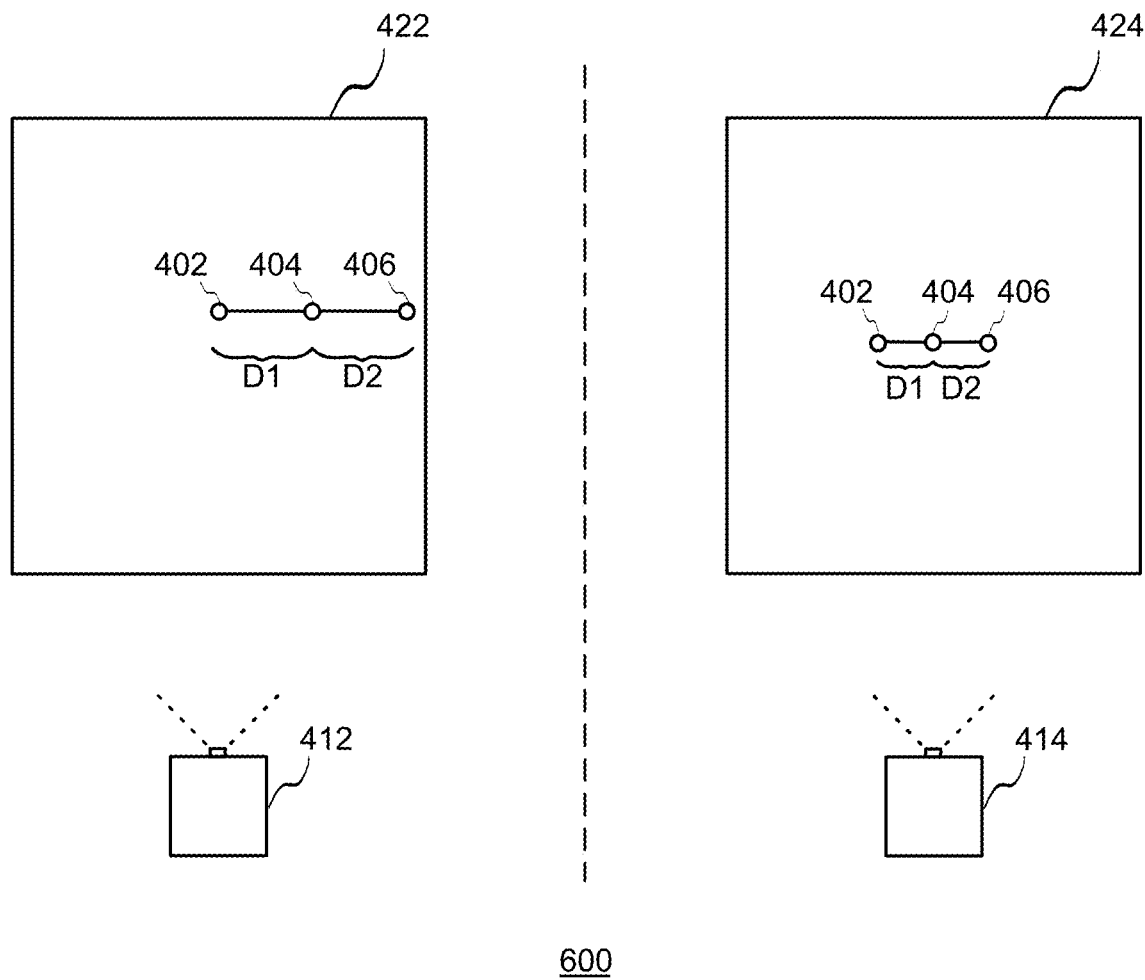
FIG. 6 is a block diagram of an example scenario including reference points in images captured by cameras in a live action scene, according to some implementations.

FIG. 6 is a block diagram of an example scenario 600 including reference points in images captured by cameras in a live action scene, according to some implementations. Shown are cameras 412 and 414, each of which are capturing respective images 422 and 424 of reference points 402, 404, and 406.

In various implementations, the distances between pairings of reference points of the at least three reference points are predetermined. In this example implementation, while distances D1 and D2 are equidistant in the 3D space, distances D1 and D2 form an aspect ratio in a 2D image, where distances D1 may differ from distance D2 in the 2D image depending on the point of view of a given camera. For example, images 422 and 424 show reference point 112 in a different location in the different image frames depending on the relative location of reference points 402, 404, and 406 to the respective camera 412 or 414 in the physical live action scene. As shown, comparing images 422 and 424, the reference points 402, 404, and 406 in image 422 are farther apart from each other in image 422 compare to their relative locations in image 224, where there may be some foreshortening due to the camera angle.

In various implementations, system 102 computes the distance between each pairing of reference points 402-406, including all combinations. In some implementations, system 102 generates a graph of the distance between each reference point to every other reference point of wand 400. System 102 computes or ascertains the location of each of the reference points of wand 400 and the orientation of the reference points of wand 400. Based on the location and orientation of reference points 402-406, system 102 computes the location and orientation of cameras 412 and 414 and any other cameras capturing images of reference points 402-406.

In various implementations, system 102 sends images 422 and 424 to a performance capture system, which may be remote to system 102 or integrated with system 102. In various implementations, system 102 computes or ascertains the location and orientation of each camera (e.g., camera 412, camera 414, etc.) based on the aspect ratio of distances D1 and D2.

In various implementations, the distances D1 and D2 between pairings of reference points 402-406 are changeable. For example, distances D1 and D2 may be set at 1 inch each or may be changed to be set at 2 inches each, 5 inches each, etc. While the physical distances D1 and D2 associated with reference points 402-406 may be equidistance, they may also be different. For example, distance D1 may be set to 3 inches while distance D2 may be set to 6 inches. The exact distances D1 and D2 may vary, depending on the particular implementation.

In various implementations, as long as the distances D1 and D2 are predetermined, system 102 may carry out implementations described herein based on those known distances. In some implementations, the system distances D1 and D2 may be set based on reference points 402-406 being attached to the rigid form (e.g., wand) at different points.

Figure 7:
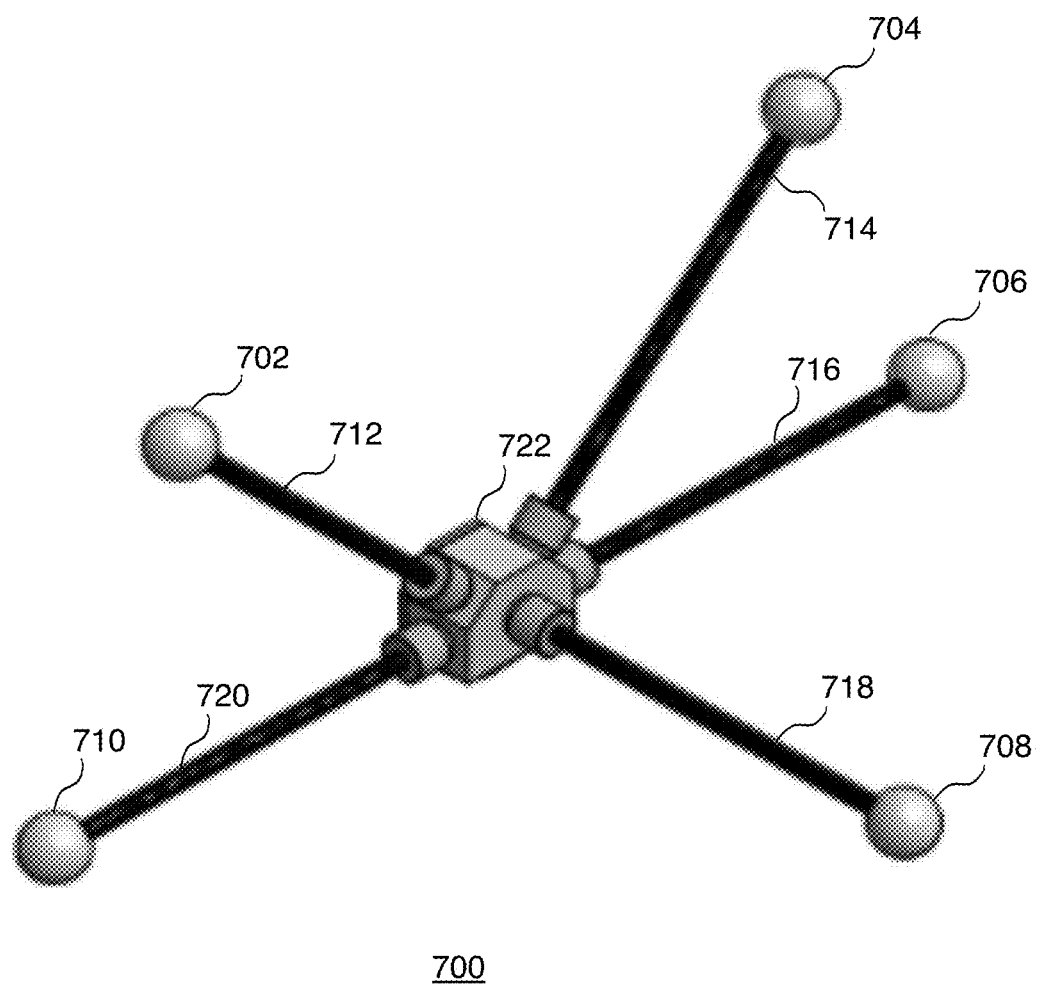
FIG. 7 is a block diagram of an assembly that includes reference points arranged in a 3D form, according to some implementations.

While reference points 402-406 are shown to be arranged in a straight line, the particular arrangement and relative positions of the reference points may vary and will depend on the particular implementation. FIG. 7 below shows a different configuration or constellation of reference points in a reconfigurable assembly.

Referring again to FIG. 5, at block 504, system 102 receives reference point data generated from a performance capture system. In various implementations, the reference point data is based on at least three reference points 402, 404, and 406 in the live action scene. For ease of illustration, as indicated above, three reference points 402, 404, and 406 are shown for the calibration of cameras 412 and 414. There may any number of reference points used for the calibration of cameras 412 and 414. In various implementations, the three reference points are attached to a predetermined form. For example, in various implementations, the three reference points are attached to a linear form or straight form, as shown. As described in more detail herein, the distances between the reference points are predetermined. In various implementations, such a straight form may be a rigid mobile form such as a wand, etc., which as person can carry and place in the live action scene. As such, the three reference points 402, 404, and 406 form a straight line. In some implementations, a person may wave a wand in the live action scene, where the performance capture system of system 102 generates a point cloud based on camera detection of the reference points. In some implementations, the reference point data may include two-dimensional coordinates of the reference points.

At block 506, system 102 locates the reference points in one or more images of the images. In various implementations, the locations of the reference points in a given image are determinable. For example, in some implementations, system 102 may determine the location of each reference point relative to any one or more other references points based on pixel locations in the image. For example, in various implementations, the distance between pairs of reference points are predetermined, as described herein. From computed ratios between pairs of reference points, system 102 may ascertain ratios between different pairs of reference points. The system may then determine the orientation and location of each reference point in the image. Other example implementations directed to locating reference points in images are describe in more detail herein.

At block 508, system 102 computes ratios of the distances between each adjacent pair of reference points in the one or more images. Example implementations are described in more detail herein, such as in FIG. 4 for example.

At block 510, system 102 determines the location and orientation of each camera based on the reference point data. In various implementations, in addition to system 102 determining a location and orientation of each camera based on the reference point data, system 102 may also determine the location and orientation of each camera based on any one or more location techniques. In various implementations, system 102 may determine such locations and orientations according to the techniques described herein. For example, in some implementations, system 102 may triangulate each camera of the set of cameras based on the reference point data. System 102 may also perform trilateration on each camera of the set of cameras based on the reference point data.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

FIG. 7 is a block diagram of an assembly 700 that includes reference points arranged in a 3D form, according to some implementations. As shown, assembly 700 includes reference points 702, 704, 706, 708, and 710. In various implementations, reference points 702-710 form a cluster of reference points, where reference points 702-710 form a 3D arrangement or pattern. Various implementations directed to reference points are described in more detail herein, in connection with FIGS. 17A and 17B, for example. In various implementations, the reference points are attached to a 3D assembly. In various implementations, the 3D assembly is a rigid mobile form, which a person can carry and place in the live action scene. As described in more detail herein, in various implementations, the distances between one or more pairs of reference points vary. In various implementations, the distances between one or more pairs of reference points are different. In various implementations, the distances between one or more pairs of reference points are changeable. In various implementations, the distances between pairs of reference points are based on one or more aspects of the extensions or rigid arms. For example, in some implementations, such aspects may include the lengths of rigid arms coupled to a pair of corresponding reference points, the angles between the rigid arms, etc. Various example implementations directed to distances between pairs of reference points are described in more detail herein. As described in more detail herein, the distances between the pairs of reference points are used to compute reference point data generated from a performance capture system.

In various implementations, one or more of the reference points described herein, may be implemented by light emitting diodes (LEDs). In some implementations, the colors of the LEDs may be the same. In some implementations, the colors of the LEDs may vary. In some implementations, the LEDs of the references points may be detected by regular cameras and/or infrared cameras.

Figure 9:
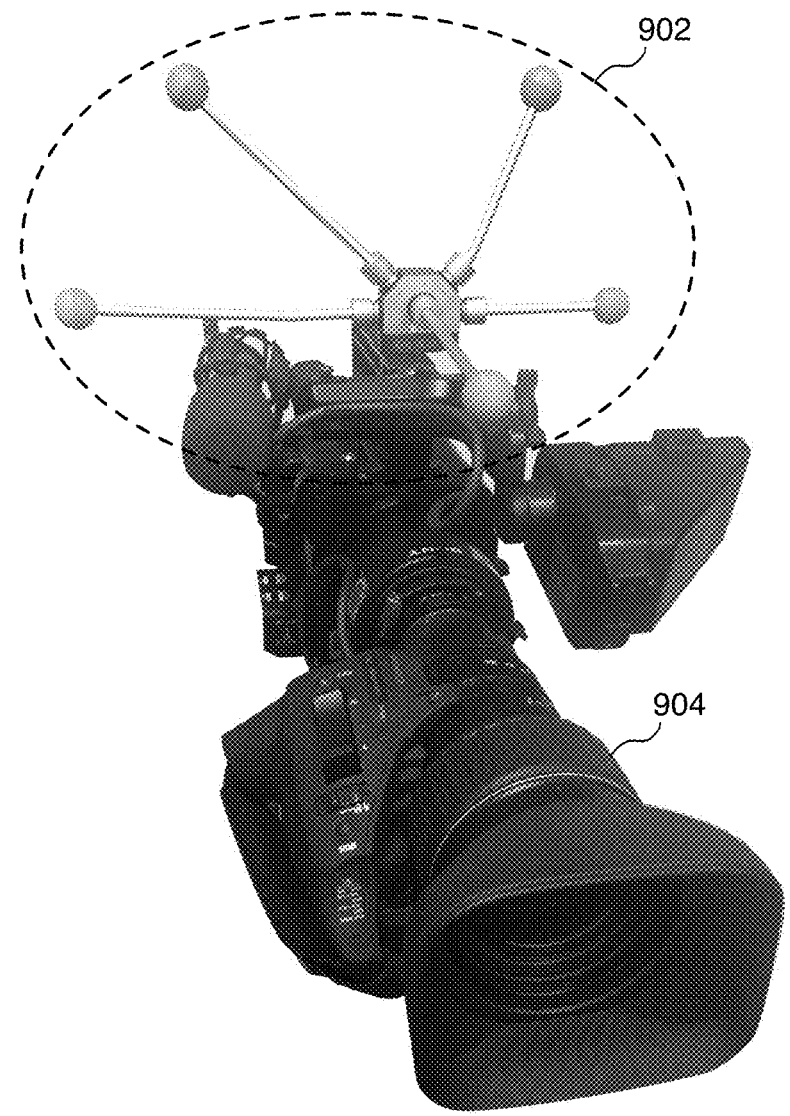
FIG. 9 is an image of an example assembly that is mounted on a camera, according to some implementations.

In the example implementation shown, reference points 702, 704, 706, 708, and 710 are attached to respective extensions or rigid arms 712, 714, 716, 718, and 720. In various implementations, reference points 702-710 are coupled to the ends of extensions/rigid arms 712-720. Rigid arms 712, 714, 716, 718, and 720 attach to a base, body, or hub 722, and extend outward away from hub 722. The terms body, hub, and base may be used interchangeably. In various implementations, the base is configured to removably couple to a camera and/or other objects in the live action scene (as shown in FIG. 9, for example). Rigid arms 712, 714, 716, 718, and 720 may also be referred to as arms, extensions, stalks, or rods. Rigid arms 712, 714, 716, 718, and 720 may be made of any suitable rigid material (e.g., aluminum, etc.). The length of each rigid arm may vary. Also, the lengths of different rigid arm may be different. While rigid arms 712, 714, 716, 718, and 720 are shown as being straight. In some implementations, one or more of rigid arms 712, 714, 716, 718, and 720 may be curved and/or bent. While five reference points 702, 704, 706, 708, and 710 are shown, the number of reference points in the cluster may vary, and will depend on the implementation. For example, there may be 4 reference points or 5 reference points, etc., attached to the wand. In various implementations, the distances between pairings of the reference points are predetermined. This would be a similar case in a scenario with assembly 700 as it would be in a scenario with group 400 or wand 400 in FIGS. 4 and 6.

In various implementations, system 102 computes the distance between each pairing of reference points 702-710, including all combinations. In some implementations, system 102 generates a graph of the distance between each reference point to every other reference point of assembly 700 in of the rigid body. System 102 computes or ascertains the location of each of the reference points of assembly 700 and the orientation of the cluster of reference points of assembly 700. Based on the location and orientation of reference points 702-710, system 102 may compute the location and orientation of each camera capturing images of reference points 702-710.

While reference points 702-710 are shown to be arranged in a particular configuration, the particular arrangement and relative positions of the reference points may vary and will depend on the particular implementation. FIG. 9 below shows components of an assembly that may be reconfigured into different configurations or constellations of reference points.

Figure 8:
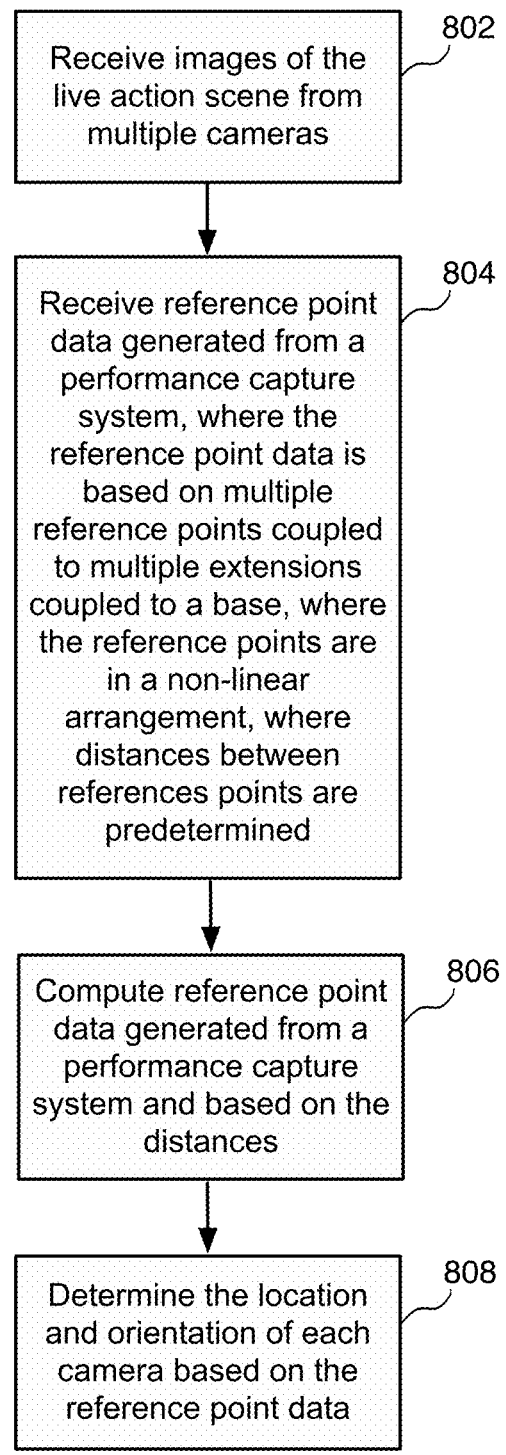
FIG. 8 is an example flow diagram for calibrating cameras in a live action scene, according to some implementations.

FIG. 8 is an example flow diagram for calibrating cameras in a live action scene, according to some implementations. Referring to both FIGS. 1, 7, and 8, a method is initiated at block 802, where a system such as system 102 receives images of the live action scene from multiple cameras.

At block 804, system 102 receives reference point data generated from a performance capture system. In various implementations, the reference point data is based on multiple reference points coupled to multiple extensions coupled to a base, as shown in FIG. 7, for example. In various implementations, the reference points are in a non-linear arrangement, where distances between references points are predetermined.

In various implementations, the reference point data is based on at least three reference points in the live action scene. In the example of FIG. 7, five reference points 702-710 are shown for the calibration of cameras. There may any number of reference points used for the calibration of cameras. In various implementations, reference points 702-710 are attached to 3D assembly 700, as shown. As indicated above, in various implementations, such a 3D assembly may be a rigid mobile form such as a cluster form, a tiara form, etc., which a person can carry and place in the live action scene.

At block 806, system 102 computes reference point data generated from a performance capture system and based on the distances. Implementations directed to computing reference point data are described in more detail herein.

At block 808, system 102 determines the location and orientation of each camera based on the reference point data. In various implementations, in addition to system 102 determining a location and orientation of each camera based on the reference point data, system 102 may also determine the location and orientation of each camera based on any one or more location techniques. In various implementations, system 102 may determine such locations and orientations according to the techniques described herein. For example, in some implementations, system 102 may triangulate each camera of the set of cameras based on the reference point data. System 102 may also perform trilateration on each camera of the set of cameras based on the reference point data.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

FIG. 9 is an image of an example assembly 902 that is mounted on a camera 904, according to some implementations. Assembly 902 may be used to represent assembly 700 of FIG. 7 or other assembly implementations described herein such as those shown in FIGS. 10, 11, and 12, for example. In various implementations, assembly 902 is configured to removably couple to a camera such as camera 904 or other objects in the live action scene. In some scenarios, assembly 902 may be simply placed on the ground or other stationary object in the live action scene without being mechanically attached.

Figure 10:
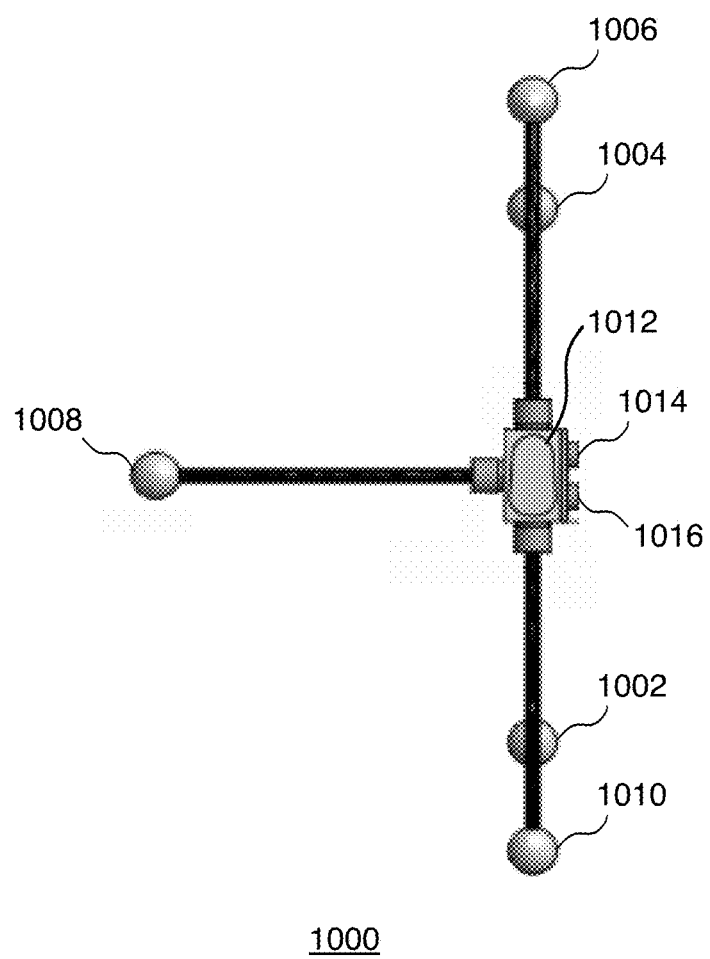
FIG. 10 is an attachment-side view of an example assembly, according to some implementations.

FIG. 10 is an attachment-side view of an example assembly 1000, according to some implementations. Shown are reference points 1002, 1004, 1006, 1008, and 1010. Also shown is an attachment mechanism 1012, which may be used to attach to an object such as camera 904 of FIG. 9. Other implementations directed to an attachment mechanism are described in more detail herein, such as in connection with FIG. 14, for example.

Also shown are electrical connectors 1014 and 1016, which are used to pass or supply electrical current to reference points 1102-1010. Reference points 1102-1010 may be any signal emitting devices such as light emitting diodes (LEDs), infrared red (IR) light devices, etc. In some implementations, a given reference point may include one more signal emitting devices (e.g., a cluster of 6-7 LEDs, etc.) and may be contained in a translucent container such as a ball. The translucent container may facilitate reference point in providing uniform light.

The type of electrical connectors used may vary, depending on the particular implementation. For example, in some implementations, electrical connectors 1014 and 1016 may be LEMO connectors. Other implementations directed to electrical connectors are described in more detail herein, such as in FIGS. 15 and 16, for example.

Figure 11:
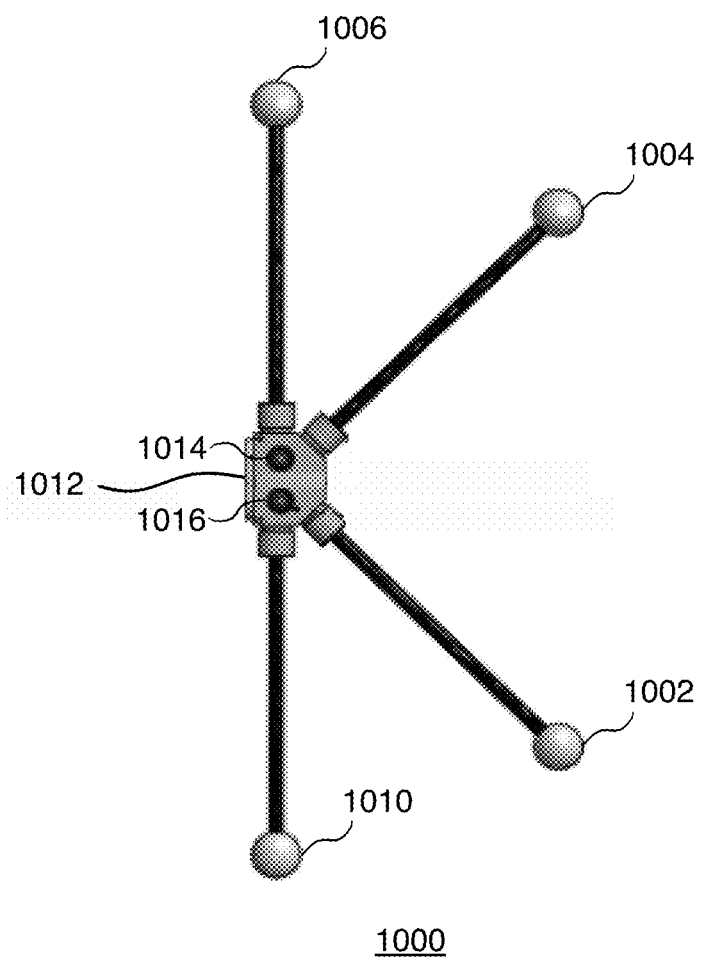
FIG. 11 is an electrical connector-side view of the example assembly of FIG. 10, according to some implementations.

FIG. 11 is an electrical connector-side view of the example assembly 1000 of FIG. 10, according to some implementations. Shown are reference points 1002, 1004, 1006, and 1010. Also shown is an attachment mechanism 1012, which may be used to attach to an object such as camera 904 of FIG. 9.

Also shown are electrical connectors 1014 and 1016, which, as indicated above, are used to supply electrical current to reference points 1002-1010. Other implementations directed to an attachment mechanism are described in more detail herein, such as in FIG. 14, for example. As indicated above, other implementations directed to electrical connectors are described in more detail herein, such as in FIGS. 15 and 16, for example.

Figure 12:
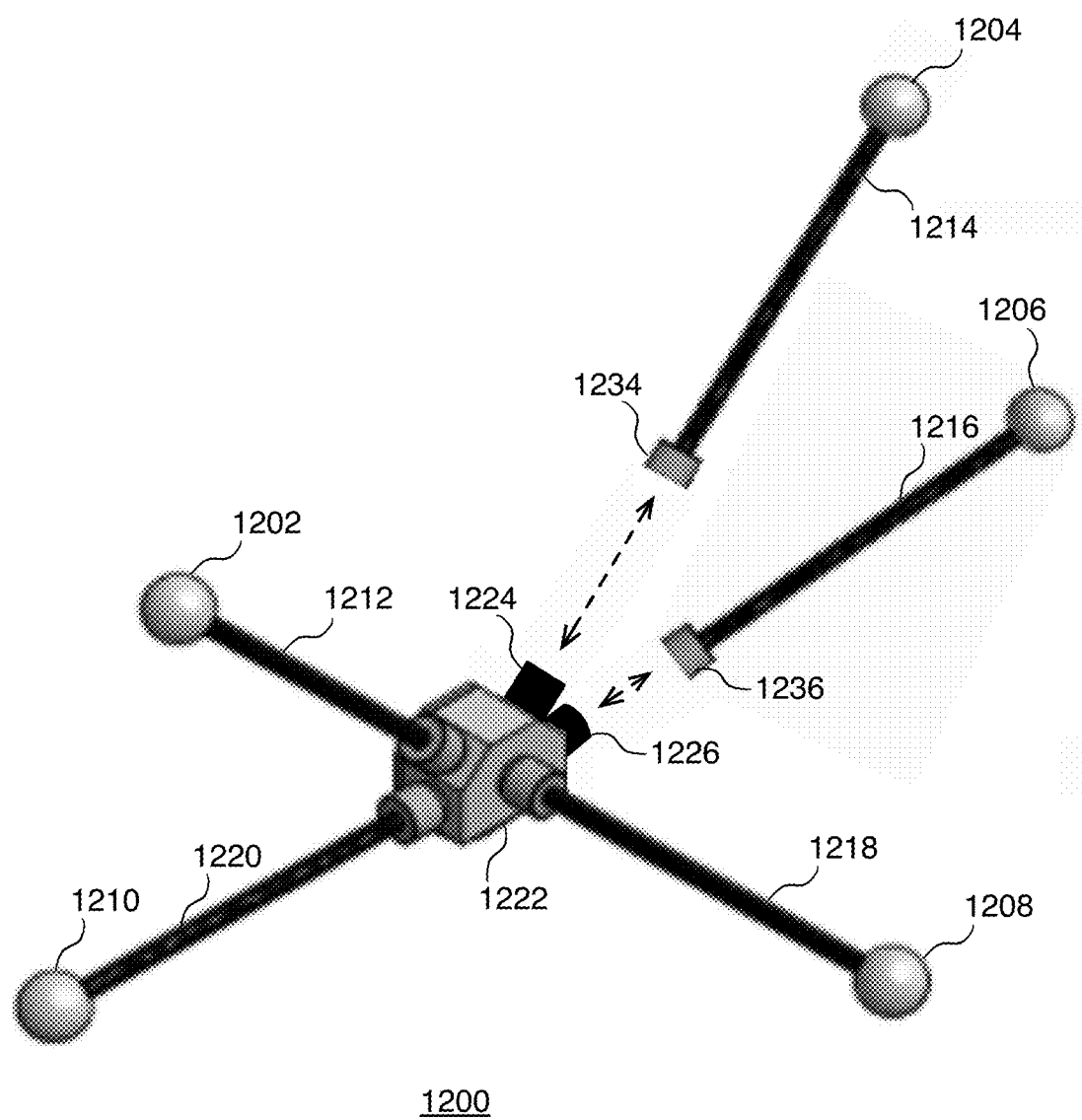
FIG. 12 is a block diagram of components including reference points that are reconfigurable to be arranged in a three-dimensional form, according to some implementations.

FIG. 12 is a block diagram of an example assembly 1200 including reference points that are reconfigurable to be arranged in a 3D form, according to some implementations. As shown, assembly 1200 includes reference points 1202, 1204, 1206, 1208, and 1210. In various implementations, reference points 1202-1210 form a cluster of reference points, where reference points 1202-1210 are configured to couple or attach to corresponding rigid arms 1212, 1214, 1216, 1218, and 1220. Rigid arms 1212-1220 may also be referred to as arms, extensions, stalks, or rods. In various implementations, rigid arms are removably coupled to a body 1222 or hub 1222. The terms body, hub, and base may be used interchangeably.

Different techniques may be used to couple references points 1202-1210 to respective rigid arms 1212-1220, and to couple rigid arms 1212-1220 to hub 1222. For example, in some implementations, references points 1202-1210 may each have a hole for receiving a respective rigid arm 1212-1220, and hub 1222 may have multiple arm connectors for connecting to multiple corresponding rigid arms.

In some implementations, each rigid arm 1212-1220 may be threaded at the ends, and the inside of the holes of the references points 1202-1210 may also be threaded. As such, rigid arms 1212-1220 may be inserted and screwed into respective references points 1202-1210. In some implementations, the connecting portions are not threaded, where rigid arms 1212-1220 may be inserted into respective references points 1202-1210 and held in or secured by friction or other techniques.

As shown, reference points 1202-1210 form a 3D shape or 3D pattern. As indicated herein, a person can carry the assembly and place it in the live action scene, such as on a camera. In various implementations, distances between pairs of reference points are based on one or more aspects of the rigid arms. As described in more detail herein, such aspects may include the length of each rigid arm relative to other rigid arms. In some implementations, the distances between pairings of the reference points are predetermined. In some implementations, the distances between pairings of the reference points are changeable. The distances may be changed or adjusted based on the lengths of rigid arms 1212-1220. Some arms may match in length, and some arms may differ in length.

In various implementations, the 3D pattern formed by reference points 1202-1210 is asymmetrical. When the reference points of a given assembly have known distances form each other and/or known distances between pairs of reference points, the asymmetric enables the performance capture system to compute the position and orientation of the assembly (and camera attached to the assembly).

As shown, rigid arms 1212-1220 extend outward away from hub 1222. Because the lengths of rigid arms 1212-1220 may vary, the distance between any given reference point and hub 1222 may vary, depending on the length of each arm. Also, the distance between two given reference points may vary, depending on the length of each arm.

In the example shown, rigid arms 1214 and 1216 are detached from hub 1222 and may be attached to hub 1222 via respective arm connectors 1224 and 1226. As shown, rigid arm 1214 has a connector sleeve 1234 that connects to arm connector 1224. Similarly, rigid arm 1216 has a connector sleeve 1236 that connects to arm connector 1226. Rigid arms 1202, 1208, and 1210 also removably couple or connect to corresponding arm connectors (not shown).

The techniques for connection between a given rigid arm and a given corresponding arm connector may vary, depending on the particular implementation. For example, in some implementations, a connector sleeve such as connector sleeve 1234 may be threaded internally and an arm connector such as arm connector 1224 may be threaded externally. As such, a connector sleeve may be screwed over an arm connector for attachment. In various implementations, a connector sleeve may be referred to as a female connector and an arm connector may be referred to as a male connector. In some implementations, the connecting portions are not threaded, where rigid arms 1212-1220 may be coupled or secured to respective arm connectors (e.g., arm connectors 1224, 1226, etc.) by friction or by other techniques.

As indicated herein, each rigid arm is removably coupled to the hub. As such, in the various implementations, each rigid arm may be exchanged or swapped with a different rigid arm or substitute extension having a different length. This achieves varying distances between and positions of different reference points. In various implementations, the distances between pairs of reference points may be based on lengths of the rigid arms coupled to each pair of reference points. For example, the longer the length of any one of rigid arms 1214 and 1216 relative to the other increases the distance between reference points 1204 and 1206 being positioned at the ends of rigid arms 1214 and 1216.

Conversely, the shorter the length of any one of rigid arms 1214 and 1216 relative to the other rigid arm decreases the distance between reference points 1204 and 1206 being positioned at the ends of rigid arms 1214 and 1216. Because the rigid arms extend away from hub 1222, the lengths of rigid arms are proportional to the distance between the corresponding reference points connected to those rigid arms. These techniques for changing the relative locations of reference points based on varying rigid arm lengths apply to any given reference point relative to any other reference point in the assembly. In some implementations, one or more rigid arms may be telescopic thereby enabling the lengths of each rigid arms to be extended or shortened.

In various implementations, each rigid arm 1212-1220 may couple or attach to hub 1222 at different locations and at different angles. As such, the cluster of reference points may extend in different directions. In various implementations, the distances between pairs of reference points may be based on angles between the rigid arms coupled to each pair of reference points. For example, as the angle between any given two rigid arms increases, the distance between corresponding reference points attached to the ends of the two rigid arms increases proportionally. Conversely, as the angle between any given two rigid arms decreases, the distance between corresponding reference points attached to the ends of the two rigid arms decreases proportionally. Because the rigid arms extend away from hub 1222, the angle between rigid arms is proportional to the distance between the corresponding reference points connected to those rigid arms. These techniques for changing the relative locations of reference points based on varying rigid arm lengths apply to any given reference point relative to any other reference point in the assembly.

While rigid arms 1212-1220 are shown as being straight, in some implementations, one or more of rigid arms 1212-1220 may be curved and/or bent. In various implementations, while arms 1212-1220 are rigid, arms 1212-1220 may have a predetermined amount of malleability, and thereby enable each arm to be bent. In some implementations, one or more arms may have one or more hinges that enable a given arm to be bent in different directions in order to reposition a given reference point. This enables a user to move a given reference point out of the way as needed. For example, a given reference point may be visually blocked partially or fully by other camera components or by another camera. In another example, a given rigid arm and/or corresponding reference point may need to be moved to accommodate an addition of a particular auxiliary camera component. In some implementations, some rigid arms may be extendable to a locked position for fixed lengths. For example, some rigid arms may be telescopic or may joined to an extension arm. Some rigid arms may have a gooseneck structure. In various implementations, once the positions of reference points are set, locked into place, and stable), the system may perform calibrations. While five reference points 1202-1210 are shown, the number of reference points in a cluster may vary, depending on the particular implementation. For example, there may be 3 reference points, 4 reference points, 6 reference points, etc., attached to hub 1222.

In various implementations, system 102 computes the distance between each pairing of reference points 1202-1210, including all combinations. In some implementations, system 102 generates a graph of the distance between each reference point to every other reference point of assembly 1200 of the rigid body. System 102 computes or ascertains the location of each of the reference points of assembly 1200 and the orientation of the cluster of reference points of assembly 1200. Based on the location and orientation of reference points 1202-1210, system 102 may compute the location and orientation of each camera capturing images of reference points 1202-1210.

While reference points 1202-1210 are shown to be arranged in a particular configuration or constellations of reference points, the particular arrangement and relative positions of the reference points may vary and will depend on the particular implementation.

Figure 13:
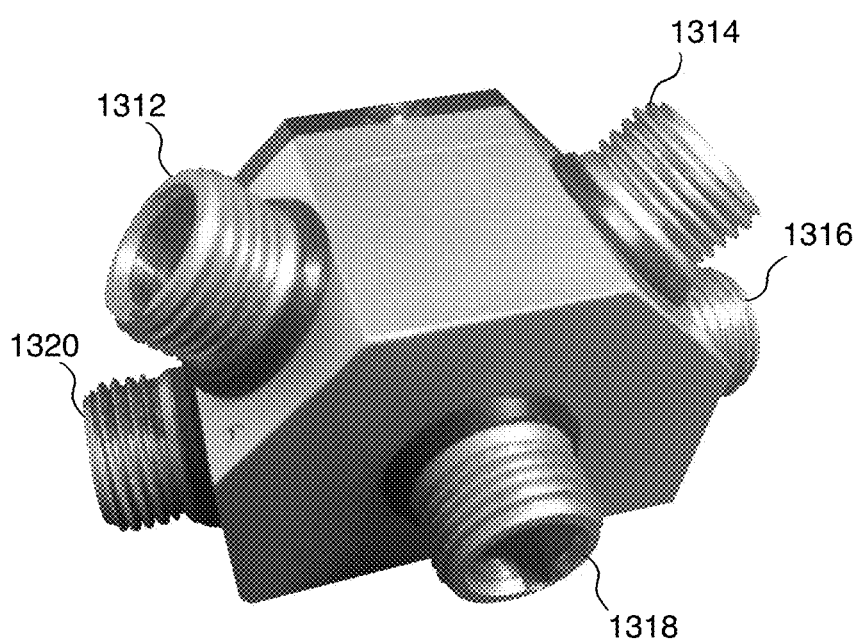
FIG. 13 is an image of an example hub of an assembly, according to some implementations.

FIG. 13 is an image of an example hub 1300 of an assembly, according to some implementations. In various implementations, hub 1300 may be used to implement hub 722 of FIG. 7 or other hubs and may apply to other implementations described herein. Shown are arm connectors 1312, 1314, 1316, 1318, and 1320 with no rigid arms connected. In this particular example, arm connectors 1312, 1314, 1316, 1318, and 1320 are treaded for coupling to rigid arms (not shown).

Figure 14:
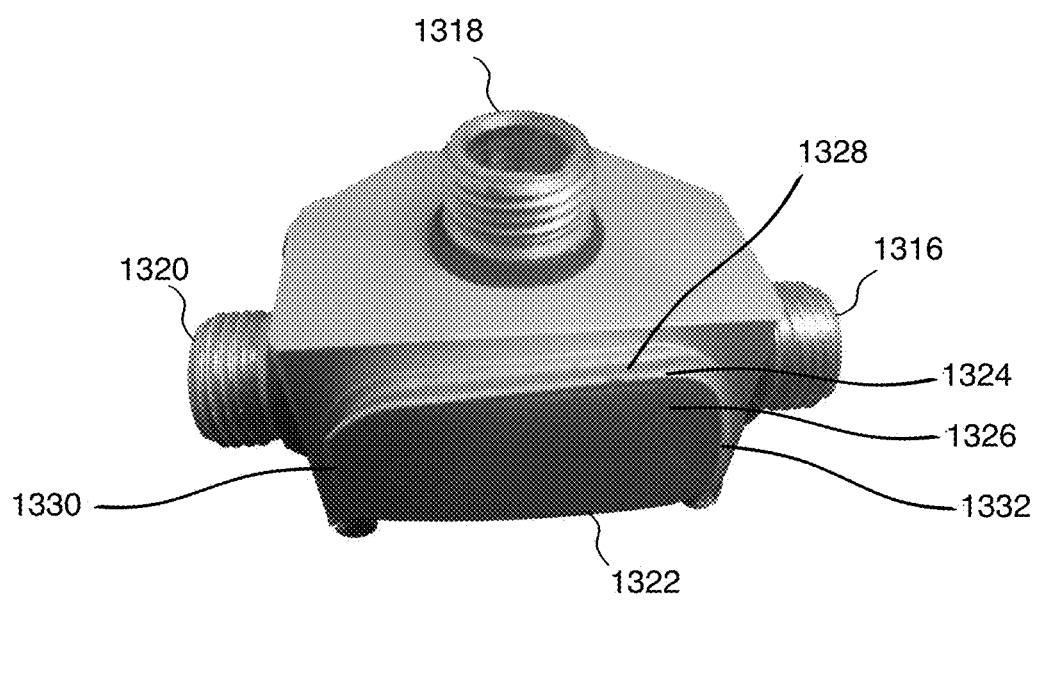
FIG. 14 is an image of the example hub of FIG. 13 showing an attachment mechanism, according to some implementations.

FIG. 14 is an image of the example hub 1300 of FIG. 13 showing an attachment mechanism, according to some implementations. Shown are arm connectors 1316, 1318, and 1320 with no rigid arms connected. Also shown is an attachment mechanism 1322. In various implementations, attachment mechanism 1322 may be used to implement attachment mechanism 1012 of FIG. 10. As shown, attachment mechanism 1322 is substantially rectangular. The particular shape of the attachment mechanism may vary, depending on the particular implementation. For example, the attachment mechanism may be square, circular, etc. A benefit of the rectangular shapes is that when locked into place without spinning or having other undesired movements.

In various implementations, attachment mechanism 1322 has a lip or rail 1324 that extends outwardly and substantially flush with an outer surface 1326 along at least a portion of outer surface 1326 as shown. This enables attachment mechanism 1322 to slide or insert into a slot of a receiving mechanism (not shown) of an object such as a camera. Attachment mechanism 1322 may be referred to as a male connector and the receiving mechanism may be referred to as a female connector having the slot.

In various implementations, attachment mechanism 1322 has a trench or depression 1328 that depresses inwardly and substantially perpendicular to outer surface 1326 along at least a portion of attachment mechanism 1322 as shown. This enables attachment mechanism 1322 to slide or insert into a slot of a receiving mechanism (not shown) of an object such as a camera. In some implementations, the receiving mechanism (not shown) of an object may have a corresponding rail (not shown) internal to a cavity of the receiving mechanism. As the receiving mechanism receives attachment mechanism 1322, the rail internal to a cavity of the receiving mechanism guides attachment mechanism 1322 into the slot and cavity of the receiving mechanism. More specifically, the rail internal to a cavity of the receiving mechanism slides within depression 1328 as the receiving mechanism receives attachment mechanism 1322.

In various implementations, outer surface 1326 of attachment mechanism 1322 has an end 1328 that is narrower than an opposite end 1330. This tapering shape enables a user to intuitively and conveniently insert attachment mechanism 1322 into the receiving mechanism in an appropriate direction.

Figure 15:
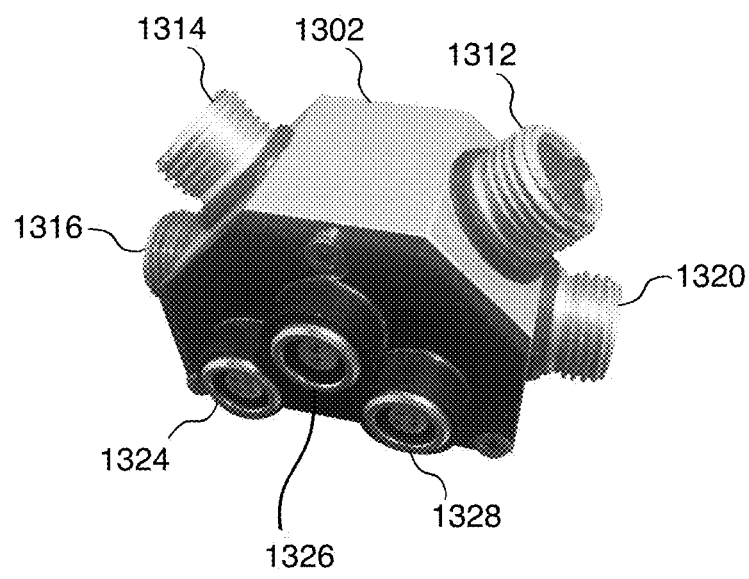
FIG. 15 is an image of the example hub of FIG. 13 showing electrical connectors, according to some implementations.

FIG. 15 is an image of the example hub 1300 of FIG. 13 showing electrical connectors, according to some implementations. Shown are arm connectors 1312, 1314, 1316, and 1320 with no rigid arms connected. Also shown are electrical connectors 1324, 1326, and 1328. In operation, electrical connectors 1324, 1326, and 1328 provide electric current to drive signal emitting devices (e.g., LEDs, etc.) of reference points via respective arm connectors. Further example implementations directed to electrical connectors 1324, 1326, and 1328 are described in more detail below in connection with FIG. 16, for example.

Figure 16:
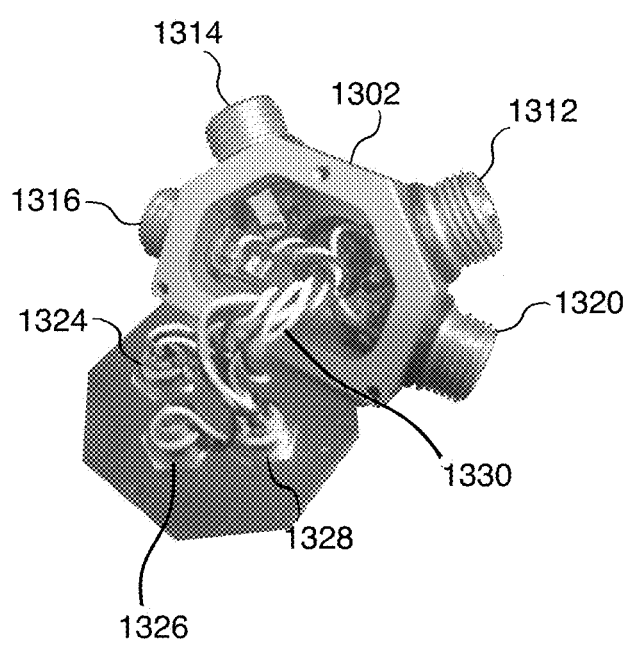
FIG. 16 is an image of the example hub of FIG. 13 showing electrical connectors and corresponding electrical wires, according to some implementations.

FIG. 16 is an image of the example hub 1300 of FIG. 13 showing electrical connectors and corresponding electrical wires, according to some implementations. Shown are arm connectors 1312, 1314, 1316, and 1320 with no rigid arms connected. Also shown are electrical connectors 1324, 1326, and 1328. In various implementations, in operation, each of electrical connectors 1324, 1326, and 1328 forms a part of a channel that receives electric current from an electricity source such as a battery, and passes or provides electric current to drive signal emitting devices of reference points via respective arm connectors and rigid arms. As shown wires 1330 connect between electrical connectors 1324, 1326, and 1328 and arm connectors 1312, 1314, 1316, and 1320, as well as arm connector 1318 (shown in FIGS. 13 and 14). Further example implementations directed to electrical connectors 1324, 1326, and 1328 are described in more detail below in connection with FIG. 16, for example.

Figure 17A:
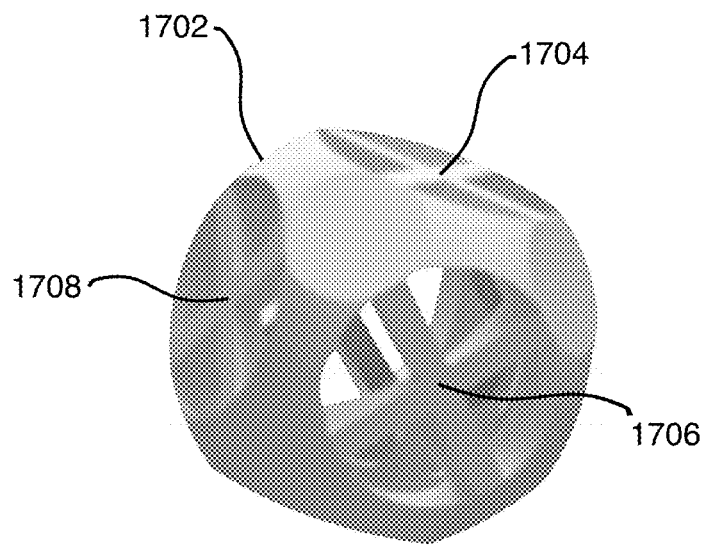
FIG. 17A is an image of an example reference point structure for holding light emitting diodes (LEDs), which may be used for implementations described herein.

FIG. 17A is an image of an example reference point structure 1702 for holding light emitting diodes (LEDs), which may be used for implementations described herein. In various implementations, reference point structure 1702 may be used to implement the reference points described herein such as reference points 702-710 of FIG. 7 and/or reference points 1002-1010 of FIGS. 10 and 11, and/or reference points 1202-1210 of FIG. 12, for example. As shown, reference point structure 1702 is substantially spherical or die shaped.

In various implementations, reference point structure 1702 has multiple LED surfaces for mounting LEDs. The number of LED surfaces may vary, depending on the particular implementation. In the implementation shown, reference point structure 1702 has 6 LED surfaces, such as LED surfaces 1704, 1706, and 1708 (3 other LED surfaces are hidden from view). Reference point structure 1702 may be made of any suitable rigid material such as a plastic, etc.

Figure 17B:
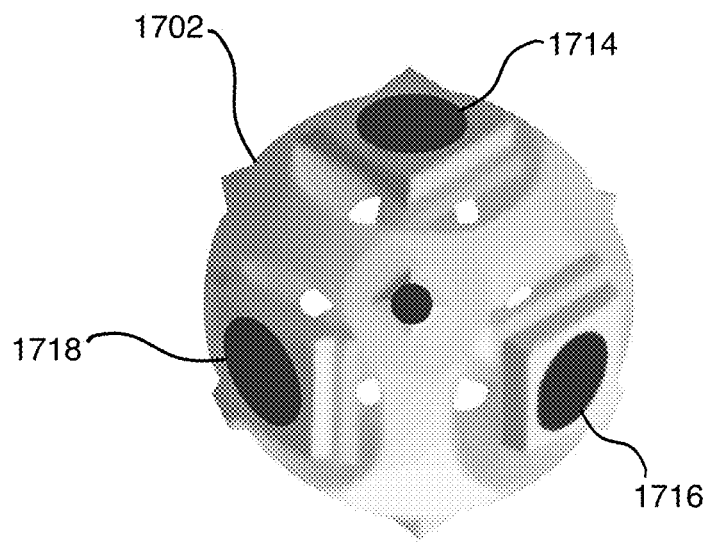
FIG. 17B is an image of the example reference point structure of FIG. 17A and LEDs attached to the reference point structure, which may be used for implementations described herein.

FIG. 17B is an image of the example reference point structure 1702 of FIG. 17A and LEDs 1714, 1716, and 1718 are attached to the reference point structure, which may be used for implementations described herein. LEDs 1714, 1716, and 1718 may be coupled or affixed to respective LED surfaces using any suitable attachment techniques. For example, in some implementations, LEDs may be attached to respective LED surfaces by friction (e.g., snapping on and off, etc.). In some implementations, each LED may be attached to an LED surface by an adhesive material (e.g., glue, tape, etc.).

In various implementations, the LED surfaces of reference point structure 1702 face outward in different directions. As a result, LEDs 1714, 1716, and 1718, etc. being affixed to such LED surfaces also face outward in different directions. This enables cameras of the performance capture system to detect reference points in the cameras field of view, and from different angles or perspectives.

In various implementations, not all surfaces need to have an LED attached. For example, reference point structure 1702 may have 5 LEDs attached, such as LEDs 1714, 1716, an 1718, an LED opposite LED 1716 (not shown), and an LED opposite LED 1718 (not shown). The LED surface opposite LED 1714 may be used to attach to an end of a rigid arm. Having multiple LED surfaces enables a sufficient number LEDs to be positioned at different locations in order to be visible and captured by different cameras positioned at different locations in a live action scene.

In various implementations, reference point structure 1702 is contained in a hollow, translucent or semi-translucent shell, such as the spheres or balls shown in FIGS. 7, 10, 11, and 12. As indicated herein, these balls are referred to as reference points, where a given ball or reference point contains a cluster of LEDs attached to a reference point structure.

In various implementations, the reference point structure and corresponding shell or ball may be of different sizes. Also, different reference point structures attached to different rigid arms may have different sizes. A bigger reference point structure size may accommodate a greater number of LED surfaces. This enables a larger LED cluster with a greater number of LEDs per reference point structure.

The power delivered to the LEDs of a given reference point structure may vary, depending on the particular implementation. For example, more power delivered to the LEDs enables the LEDs of a given reference point structure to be brighter. In various implementations, different levels of power may be delivered to different LED clusters. As such, one reference point structure may be swapped out for another. In various implementations, different rigid arms and corresponding LED clusters may be swapped.

Figure 18:
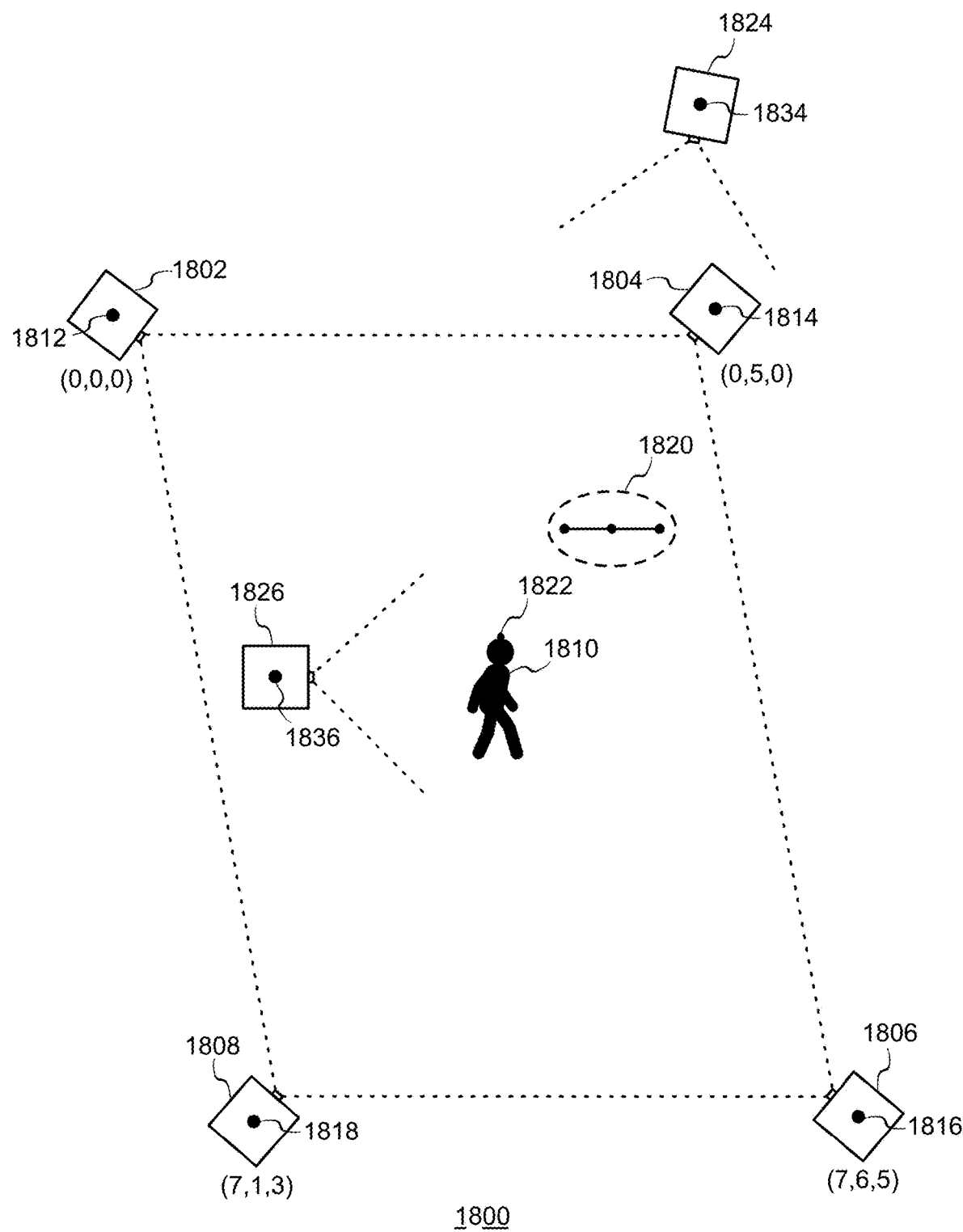
FIG. 18 is a block diagram of an example environment for calibrating cameras in a live action scene, which may be used for implementations described herein.

FIG. 18 is a block diagram of an example environment 1800 for calibrating cameras in a live action scene, which may be used for implementations described herein. As shown, cameras 1802, 1804, 1806, and 1808 capture video or images of objects such as person 1810 in their fields of view of environment 1800. In various implementations, one or more reference points are attached to at least some of the cameras in environment 1800. For example, reference points 1812, 1814, 1816, and 1818 are attached to respective cameras 1802, 1804, 1806, and 1808.

In various implementations, cameras 1802-1808 may be hidden or camouflaged such that these and other cameras do not capture images that visibly show these cameras. As such, system 102 locates and calibrates these cameras based on the reference points attached to them.

As described in more detail below, environment 1800 may have multiple levels or layers of cameras for capturing different aspects of environment 1800. For example, in various implementations, cameras 1802, 1804, 1806, and 1808 may operate on a first level or layer. In this context, two or more cameras operating at the same level or layer may mean operating at the same height (e.g., 4 feet above ground, 5 feet above ground, etc.) or same height range (e.g., between 1 foot above ground to 8 feet above ground, etc.). The particular levels or layers may vary, depending on the particular implementation.

In various implementations, cameras 1802-1804 are stationary, orientated in different directions, and have broad overlapping fields of view to capture video or images of much of environment 1800. Cameras 1802-1804 capture various reference points in their fields of view. The particular distance between cameras 1802-1804 and their overall coverage of the set may vary, and will depend on the particular implementation.

In this example implementation, cameras 1802-1804 may capture reference points 1820 for calibration purposes. In some implementations, reference points 1820 may be implemented in accordance with implementations described herein in association with the group 400 of reference points 402-406 of FIG. 4. In some implementations, reference points 1820 may be implemented in accordance with implementations described herein in association with the group 600 of FIG. 6.

Cameras 1802-1804 may also capture any combination of references points 1812-1818 associated with respective cameras 1802-1808. Cameras 1802-1804 may also capture reference point 1822 attached to person 1810. Once calibrated, each camera accurately locates the position of reference points in their fields of view.

As indicated above, environment 1800 may have multiple levels or layers of cameras for capturing different aspects of environment 1800. In various implementations, environment 1800 may also include mobile cameras 1824 and 1826. Mobile cameras 1824 and 1826 being mobile may each operate in their own separate levels or layers and/or share levels or layers throughout environment 1800. For example, in various implementations, mobile cameras 1824 and 1826 may operate at the same substantial layer with each other. In various implementations, any one or more of mobile cameras 1824 and 1826 may operate at the same substantial layer as other cameras such as cameras 1802-1804. Reference points 1834 and 1836 are attached to respective cameras 1824 and 1826, which enable cameras 1824 and 1826 to locate and track each other when in each other's field of view. It may be possible for other cameras such as cameras 1808 and 1806 to also locate and track cameras 1824 and 1826 by tracking their respective references points 1834 and 1836. This may further optimize triangulation and determination of location of orientation of cameras, as more data is available to system 102. In various implementations, each of cameras 1824 and 1826 being mobile may follow an actor and may have a narrower field of view, as these cameras may function to capture an actor (e.g., hero actor) more closely.

In various implementations, system 102 computes the positions and orientation of cameras 1802-1808 based on the reference points 1820. As described in other example implementations described herein, each camera of cameras 1802-1808 captures at least one image of reference points 1820. As indicated above, wand 400 of FIG. 4 may be used to implement reference points 1820. For example, before calibration, a person may enter the live action set and place references points 1820 (or wand 400) in a location that is in the field of view of cameras 1802-1808. Cameras 1802-1808 then each capture video or one or more images of references points 1820. System 102 then performs the calibration of cameras 1802-1808 by computing an aspect ratio between each pair of reference points 1820, and computes the location and orientation of cameras 1802-1808 based on the aspect ratios. The computed positions include the absolute location coordinates of cameras 1802-1808 in the physical space of the live action scene or set. System 102 computes the correct location in space, the correct scale, and the correct alignment.

As shown, cameras 1802-1808 are positioned at four corners in environment 1800. In this particular example scenario, camera 1802 is located at x,y,z coordinates (0,0,0), camera 1804 is located at x,y,z coordinates (0,5,0), camera 1806 is located at x,y,z coordinates (7,6,5), and camera 1808 is located at x,y,z coordinates (7,1,3). In some implementations, the coordinates of a given camera may be associated with and calibrated to be at the optical center of the lens of the given camera. The actual part of the given camera associated with a coordinate may vary, and will depend on the particular implementation.

These coordinates are examples. The actual locations of cameras 1802-1808 in the live action scene may vary, and will depend on the particular implementation. Cameras 1824 and 1826 being mobile may be located at or may relocated to any particular location in environment 1800. Also, the particular coordinate system (e.g., Cartesian, polar, etc.) that system 102 uses in computations may vary, and will depend on the particular implementation.

In some implementations, system 102 may calibrate cameras in a particular order. For example, system 102 may first calibrate two cameras such as cameras 1802 and 1804 having good angles and overlap in their fields of view. System 102 may compute the relative locations and orientations of the cameras from one to the other. System 102 may then calibrate other cameras such as cameras 1806 and 1808 in turn. In some implementations, system 102 may start with any given pair and continue calibrating cameras pair-by-pair. This technique is beneficial in that any one or more cameras can be added to the overall group of cameras on the live action set. Such added cameras may be subsequently calibrated based on the calibration of existing cameras.

Implementations described herein provide various benefits. For example, if cameras need to be recalibrated often, system 102 can quickly calibrate any already calibrated camera or newly added or moved camera to be calibrated based on existing calibrated cameras. This saves valuable set up time for filming on the live action film set or stage.

In various implementations, in addition to system 102 calibrating cameras 1802-1808 based on reference points 1820, system 182 may also calibrate cameras 1802-1808 based on other known reference points such as those attached to cameras 1802-1808. For example, if system has computed relative locations of reference points 1812, 1814, and one or more of reference points 1820, system 102 may calibrate cameras 1806 and 1808 based on those reference points captured by cameras 1806 and 1808 using associated aspect ratios.

In some implementations system 102 may also utilize one or more inertial measurement unit (IMU) sensors in each camera to estimate a location and orientation of each camera to supplement the calibration information. IMU sensors may include magnetometers, accelerometers, etc. The associated IMU measurements in combination with associated aspect ratio measurements helps system 102 to compute accurate orientation of cameras 1802-1808.

These additional techniques are beneficial in optimizing the calibration of cameras 1802-1808. By utilizing different calibration techniques, system 102 accurately calibrates the location and orientation of different cameras despite potential occlusion or referent points and varying lighting conditions.

In various implementations, the images are taken by the cameras within a predetermined time frame. For example, in some implementations, the predetermined time frame may be a predetermined number of hours (e.g., 1 hour, 10 hours, 24 hours, etc.), or predetermined number of days (e.g., 1 day, 7 days, 365 days, etc.). In some implementations, the predetermined time frame may be a based on a predetermined condition. For example, a condition may be that the cameras being calibrated have not moved (e.g., changed location and orientation) since the beginning of the calibration process. For example, as long as the cameras have not moved, the cameras may continue to take images to be used for calibration. If and when a given camera moves, the cameras may continue to captures images, but system 102 will use such images in a new calibration based on the new or current positions of the cameras.

In some implementations, system 102 performs implementations described herein in real time. In some implementations, system 102 need not perform some steps associated with implementations described herein at the same time as the images are captured. This is because there may be some delay from the processing and workflow steps before calibration is completed.

Figure 19:
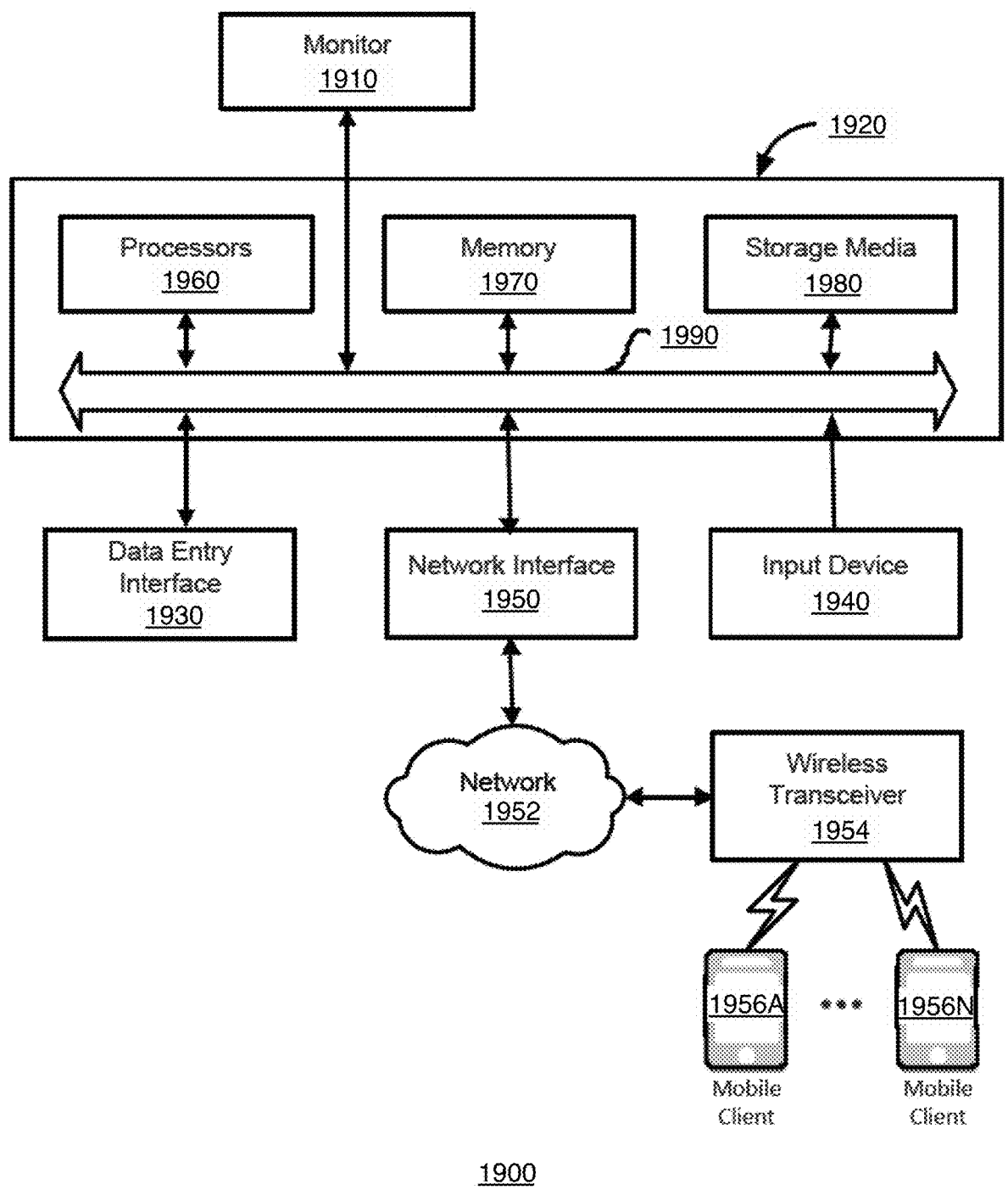
FIG. 19 is a block diagram of an example computer system, which may be used for implementations described herein.

FIG. 19 is a block diagram of an example computer system 1900, which may be used for implementations described herein. Computer system 1900 is merely illustrative and not intended to limit the scope of the claims. One of ordinary skill in the art would recognize other variations, modifications, and alternatives. For example, computer system 1900 may be implemented in a distributed client-server configuration having one or more client devices in communication with one or more server systems.

In one exemplary implementation, computer system 1900 includes a display device such as a monitor 1910, computer 1920, a data entry interface 1930 such as a keyboard, touch device, and the like, a user input device 1940, a network communication interface 1950, and the like. User input device 1940 is typically embodied as a computer mouse, a trackball, a track pad, wireless remote, tablet, touch screen, and the like. Moreover, user input device 1940 typically allows a user to select and operate objects, icons, text, characters, and the like that appear, for example, on the monitor 1910.

Network interface 1950 typically includes an Ethernet card, a modem (telephone, satellite, cable, ISDN), (asynchronous) digital subscriber line (DSL) unit, and the like. Further, network interface 1950 may be physically integrated on the motherboard of computer 1920, may be a software program, such as soft DSL, or the like.

Computer system 1900 may also include software that enables communications over communication network 1952 such as the HTTP, TCP/IP, RTP/RTSP, protocols, wireless application protocol (WAP), IEEE 902.11 protocols, and the like. In addition to and/or alternatively, other communications software and transfer protocols may also be used, for example IPX, UDP or the like. Communication network 1952 may include a local area network, a wide area network, a wireless network, an Intranet, the Internet, a private network, a public network, a switched network, or any other suitable communication network, such as for example Cloud networks. Communication network 1952 may include many interconnected computer systems and any suitable communication links such as hardwire links, optical links, satellite or other wireless communications links such as BLUETOOTH, WIFI, wave propagation links, or any other suitable mechanisms for communication of information. For example, communication network 1952 may communicate to one or more mobile wireless devices 1956A-N, such as mobile phones, tablets, and the like, via a base station such as wireless transceiver 1954.

Computer 1920 typically includes familiar computer components such as a processor 1960, and memory storage devices, such as a memory 1970, e.g., random access memory (RAM), storage media 1980, and system bus 1990 interconnecting the above components. In one implementation, computer 1920 is a PC compatible computer having multiple microprocessors, graphics processing units (GPU), and the like. While a computer is shown, it will be readily apparent to one of ordinary skill in the art that many other hardware and software configurations are suitable for use with the present invention. Memory 1970 and Storage media 1980 are examples of tangible non-transitory computer readable media for storage of data, audio/video files, computer programs, and the like. Other types of tangible media include disk drives, solid-state drives, floppy disks, optical storage media and bar codes, semiconductor memories such as flash drives, flash memories, random-access or read-only types of memories, battery-backed volatile memories, networked storage devices, Cloud storage, and the like.

Figure 20:
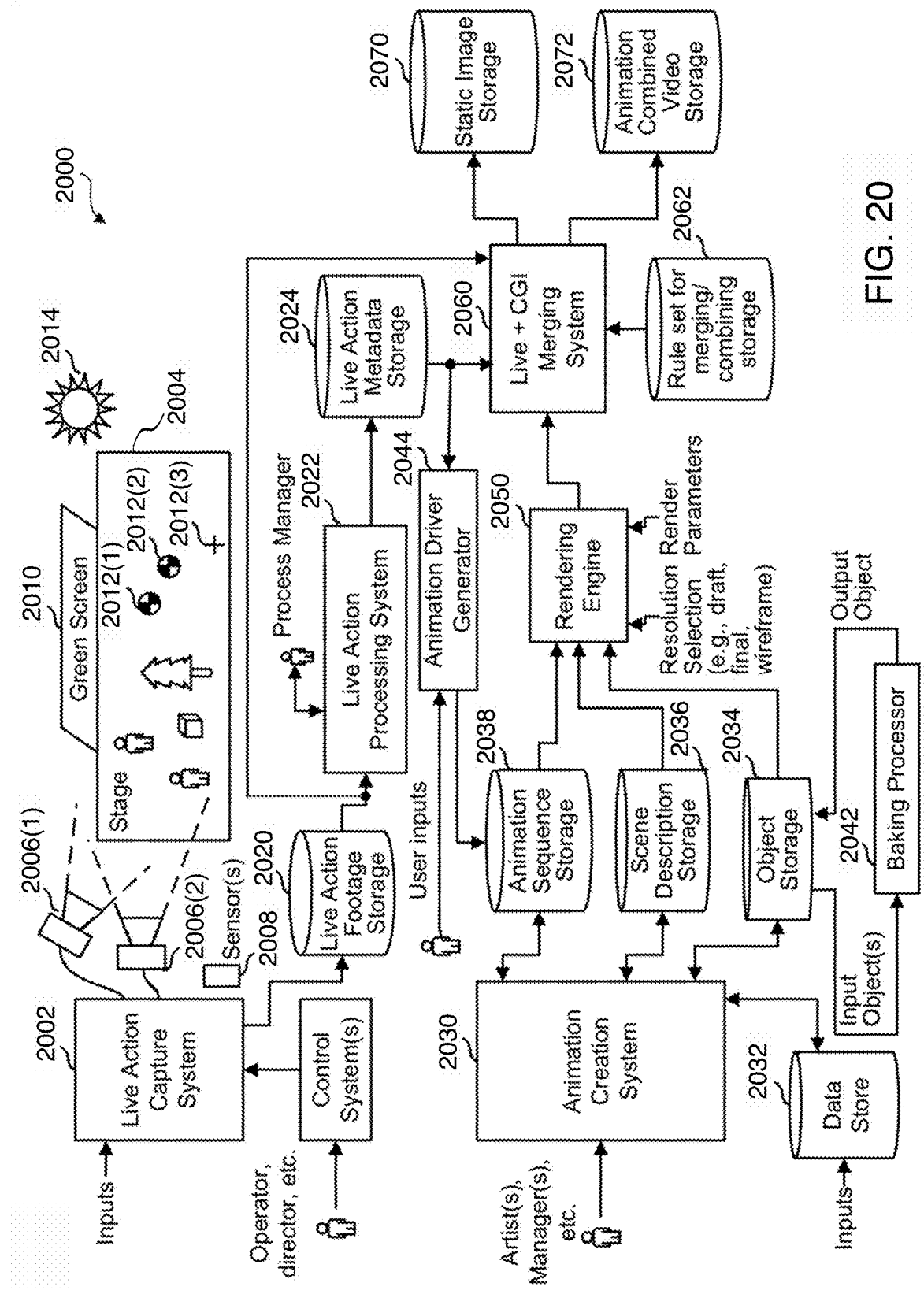
FIG. 20 is a block diagram of an example visual content generation system, which may be used to generate imagery in the form of still images and/or video sequences of images, according to some implementations.

FIG. 20 is a block diagram of an example visual content generation system 2000, which may be used to generate imagery in the form of still images and/or video sequences of images, according to some implementations. The visual content generation system 2000 might generate imagery of live action scenes, computer generated scenes, or a combination thereof. In a practical system, users are provided with tools that allow them to specify, at high levels and low levels where necessary, what is to go into that imagery. For example, a user might be an animation artist and might use the visual content generation system 2000 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 2000 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 2020 pixel columns by 2080 pixel rows. Images might or might not be stored in a compressed format, but either way, a desired image may be represented as a two-dimensional array of pixel color values. In another variation, images are represented by a pair of stereo images for three-dimensional presentations and in other variations, some or all of an image output might represent three-dimensional imagery instead of just two-dimensional views.

A stored video sequence might include a plurality of images such as the still images described above, but where each image of the plurality of images has a place in a timing sequence, and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 80 FPS, or other frame rates. In some implementations, frames are interlaced or otherwise presented for display, but for the purpose of clarity of description, in some examples, it is assumed that a video frame has one specified display time and it should be understood that other variations are possible.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, might specify positions of objects and/or lighting, as well as a camera viewpoint, and a camera view plane. Taking all of those as inputs, a rendering engine may compute each of the pixel values in each of the frames. In another example, an artist specifies position and movement of an articulated object having some specified texture rather than specifying the color of each pixel representing that articulated object in each frame.

In a specific example, a rendering engine may perform ray tracing where a pixel color value is determined by computing which objects lie along a ray traced in the scene space from the camera viewpoint through a point or portion of the camera view plane that corresponds to that pixel. For example, a camera view plane may be represented as a rectangle having a position in the scene space that is divided into a grid corresponding to the pixels of the ultimate image to be generated. In this example, a ray defined by the camera viewpoint in the scene space and a given pixel in that grid first intersects a solid, opaque, blue object, and the given pixel is assigned the color blue. Of course, for modern computer-generated imagery, determining pixel colors, and thereby generating imagery, can be more complicated, as there are lighting issues, reflections, interpolations, and other considerations.

In various implementations, a live action capture system 2002 captures a live scene that plays out on a stage 2004. The live action capture system 2002 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 2006(1) and 2006(2) capture the scene, while in some systems, there might be other sensor(s) 2008 that capture information from the live scene (e.g., infrared cameras, infrared sensors, motion capture ("mo-cap") detectors, etc.). On the stage 2004, there might be human actors, animal actors, inanimate objects, background objects, and possibly an object such as a green screen 2010 that is designed to be captured in a live scene recording in such a way that it is easily overlaid with computer-generated imagery. The stage 2004 might also contain objects that serve as fiducials, such as fiducials 2012(1)-(3), that might be used post-capture to determine where an object was during capture. A live action scene might be illuminated by one or more lights, such as an overhead light 2014.

During or following the capture of a live action scene, the live action capture system 2002 might output live action footage to a live action footage storage 2020. A live action processing system 2022 might process live action footage to generate data about that live action footage and store that data into a live action metadata storage 2024. The live action processing system 2022 might include computer processing capabilities, image processing capabilities, one or more processors, program code storage for storing program instructions executable by the one or more processors, as well as user input devices and user output devices, not all of which are shown. The live action processing system 2022 might process live action footage to determine boundaries of objects in a frame or multiple frames, determine locations of objects in a live action scene, where a camera was relative to some action, distances between moving objects and fiducials, etc. Where elements are detected by sensor or other means, the metadata might include location, color, and intensity of the overhead light 2014, as that might be useful in post-processing to match computer-generated lighting on objects that are computer-generated and overlaid on the live action footage. The live action processing system 2022 might operate autonomously, perhaps based on predetermined program instructions, to generate and output the live action metadata upon receiving and inputting the live action footage. The live action footage can be camera-captured data as well as data from other sensors.

An animation creation system 2030 is another part of the visual content generation system 2000. The animation creation system 2030 might include computer processing capabilities, image processing capabilities, one or more processors, program code storage for storing program instructions executable by the one or more processors, as well as user input devices and user output devices, not all of which are shown. The animation creation system 2030 might be used by animation artists, managers, and others to specify details, perhaps programmatically and/or interactively, of imagery to be generated. From user input and data from a database or other data source, indicated as a data store 2032, the animation creation system 2030 might generate and output data representing objects (e.g., a horse, a human, a ball, a teapot, a cloud, a light source, a texture, etc.) to an object storage 2034, generate and output data representing a scene into a scene description storage 2036, and/or generate and output data representing animation sequences to an animation sequence storage 2038.

Scene data might indicate locations of objects and other visual elements, values of their parameters, lighting, camera location, camera view plane, and other details that a rendering engine 2050 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 2030 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to the object storage 2034 as new or different objects. For example, an operator might read in an object that has dozens of specified parameters (movable joints, color options, textures, etc.), select some values for those parameters and then save a baked object that is a simplified object with now fixed values for those parameters.

Rather than have to specify each detail of a scene, data from the data store 2032 might be used to drive object presentation. For example, if an artist is creating an animation of a spaceship passing over the surface of the Earth, instead of manually drawing or specifying a coastline, the artist might specify that the animation creation system 2030 is to read data from the data store 2032 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 2044 might read in live action metadata, such as data representing movements and positions of body parts of a live actor during a live action scene, and generate corresponding animation parameters to be stored in the animation sequence storage 2038 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 2022. The animation driver generator 2044 might convert that movement data into specifications of how joints of an articulated CGI character are to move over time.

A rendering engine 2050 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test a particular interaction or direction, while clarity might be more important than speed for a movie maker to generate data that will be used for final prints of feature films to be distributed. The rendering engine 2050 might include computer processing capabilities, image processing capabilities, one or more processors, program code storage for storing program instructions executable by the one or more processors, as well as user input devices and user output devices, not all of which are shown.

The visual content generation system 2000 can also include a merging system 2060 (labeled "Live+CGI Merging System") that merges live footage with animated content. The live footage might be obtained and input by reading from the live action footage storage 2020 to obtain live action footage, by reading from the live action metadata storage 2024 to obtain details such as presumed segmentation in captured images segmenting objects in a live action scene from their background (perhaps aided by the fact that the green screen 2010 was part of the live action scene), and by obtaining CGI imagery from the rendering engine 2050.

A merging system 2060 might also read data from rule sets for merging/combining storage 2062. A very simple example of a rule in a rule set might be "obtain a full image including a two-dimensional pixel array from live footage, obtain a full image including a two-dimensional pixel array from the rendering engine 2050, and output an image where each pixel is a corresponding pixel from the rendering engine 2050 when the corresponding pixel in the live footage is a specific color of green, otherwise output a pixel value from the corresponding pixel in the live footage."

The merging system 2060 might include computer processing capabilities, image processing capabilities, one or more processors, program code storage for storing program instructions executable by the one or more processors, as well as user input devices and user output devices, not all of which are shown. The merging system 2060 might operate autonomously, following programming instructions, or might have a user interface or programmatic interface over which an operator can control a merging process. In some implementations, an operator can specify parameter values to use in a merging process and/or might specify specific tweaks to be made to an output of the merging system 2060, such as modifying boundaries of segmented objects, inserting blurs to smooth out imperfections, or adding other effects. Based on its inputs, the merging system 2060 can output an image to be stored in a static image storage 2070 and/or a sequence of images in the form of video to be stored in an animated/combined video storage 2072.

Thus, as described, the visual content generation system 2000 can be used to generate video that combines live action with computer-generated animation using various components and tools, some of which are described in more detail herein. While the visual content generation system 2000 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one implementation, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 21:
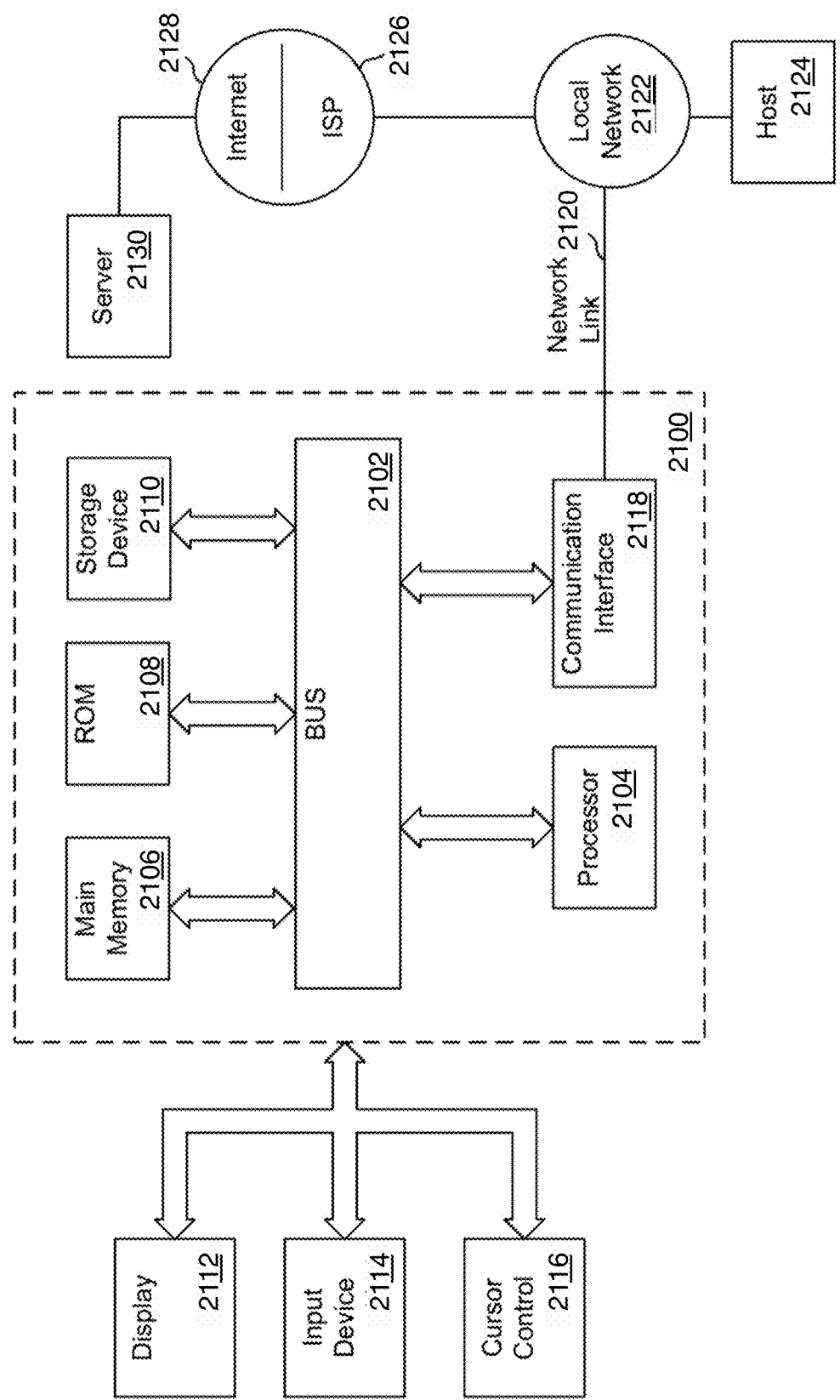
FIG. 21 is a block diagram of an example computer system, which may be used for implementations described herein.

FIG. 21 is a block diagram of an example computer system 2100, which may be used for implementations described herein. The computer system 2100 includes a bus 2102 or other communication mechanism for communicating information, and a processor 2104 coupled with the bus 2102 for processing information. In some implementations, the processor 2104 may be a general purpose microprocessor.

The computer system 2100 also includes a main memory 2106, such as a random access memory (RAM) or other dynamic storage device, coupled to the bus 2102 for storing information and instructions to be executed by the processor 2104. The main memory 2106 may also be used for storing temporary variables or other intermediate information during execution of instructions to be executed by the processor 2104. Such instructions, when stored in non-transitory storage media accessible to the processor 2104, render the computer system 2100 into a special-purpose machine that is customized to perform the operations specified in the instructions. In various implementations, instructions may include memory-storing instructions, which when executed by the one or more processors cause the computer system to carry out implementations described herein.

The computer system 2100 further includes a read only memory (ROM) 2108 or other static storage device coupled to the bus 2102 for storing static information and instructions for the processor 2104. A storage device 2110, such as a magnetic disk or optical disk, is provided and coupled to the bus 2102 for storing information and instructions.

The computer system 2100 may be coupled via the bus 2102 to a display 2112, such as a computer monitor, for displaying information to a computer user. An input device 2114, including alphanumeric and other keys, is coupled to the bus 2102 for communicating information and command selections to the processor 2104. Another type of user input device is a cursor control 2116, such as a mouse, a trackball, or cursor direction keys for communicating direction information and command selections to the processor 2104 and for controlling cursor movement on the display 2112. This input device 2114 typically has two degrees of freedom in two axes, a first axis (e.g., x) and a second axis (e.g., y), that allows the input device 2114 to specify positions in a plane.

The computer system 2100 may implement the techniques described herein using customized hard-wired logic, one or more ASICs or FPGAs, firmware, and/or program logic, which, in combination with the computer system, causes or programs the computer system 2100 to be a special-purpose machine. According to one implementation, the techniques herein are performed by the computer system 2100 in response to the processor 2104 executing one or more sequences of one or more instructions contained in the main memory 2106. Such instructions may be read into the main memory 2106 from another storage medium, such as the storage device 2110. Execution of the sequences of instructions contained in the main memory 2106 causes the processor 2104 to perform the process steps described herein. In alternative implementations, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as the storage device 2110. Volatile media includes dynamic memory, such as the main memory 2106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 2102. Transmission media can also take the form of acoustic or light waves, such as those generated during radio wave and infrared data communications.

Various forms of media may be involved in carrying one or more sequences of one or more instructions to the processor 2104 for execution. For example, the instructions may initially be carried on a magnetic disk or solid-state drive of a remote computer. The remote computer can load the instructions into its dynamic memory and send the instructions over a network connection. A modem or network interface local to the computer system 2100 can receive the data. The bus 2102 carries the data to the main memory 2106, from which the processor 2104 retrieves and executes the instructions. The instructions received by the main memory 2106 may optionally be stored on the storage device 2110 either before or after execution by the processor 2104.

The computer system 2100 also includes a communication interface 2118 coupled to the bus 2102. The communication interface 2118 provides a two-way data communication coupling to a network link 2120 that is connected to a local network 2122. For example, the communication interface 2118 may be an integrated services digital network ("ISDN") card, cable modem, satellite modem, or a modem to provide a data communication connection to a corresponding type of telephone line. Wireless links may also be implemented. In any such implementation, the communication interface 2118 sends and receives electrical, electromagnetic, or optical signals that carry digital data streams representing various types of information.

The network link 2120 typically provides data communication through one or more networks to other data devices. For example, the network link 2120 may provide a connection through a local network 2122 to a host computer 2124 or to data equipment operated by an Internet Service Provider ("ISP") 2126. The ISP 2126 in turn provides data communication services through the world wide packet data communication network now commonly referred to as the "Internet" 2128. The local network 2122 and the Internet 2128 both use electrical, electromagnetic, or optical signals that carry digital data streams. The signals through the various networks and the signals on the network link 2120 and through the communication interface 2118, which carry the digital data to and from the computer system 2100, are example forms of transmission media.

The computer system 2100 can send messages and receive data, including program code, through the network (s), the network link 2120, and the communication interface 2118. In the Internet example, a server 2130 might transmit a requested code for an application program through the Internet 2128, the ISP 2126, the local network 2122, and the communication interface 2118. The received code may be executed by the processor 2104 as it is received, and/or stored in the storage device 2110, or other non-volatile storage for later execution.

Operations of processes described herein can be performed in any suitable order unless otherwise indicated herein or otherwise clearly contradicted by context. Processes described herein may be performed under the control of one or more computer systems (e.g., the computer system 2100) configured with executable instructions and may be implemented as code (e.g., executable instructions, one or more computer programs, or one or more applications) executing collectively on one or more processors, by hardware, or combinations thereof. The code may be stored on a machine-readable or computer-readable storage medium, for example, in the form of a computer program including a plurality of machine-readable code or instructions executable by one or more processors of a computer or machine to carry out implementations described herein. The computer-readable storage medium may be non-transitory. The code may also be carried by any computer-readable carrier medium, such as a transient medium or signal, e.g., a signal transmitted over a communications network.

Although the description has been described with respect to particular implementations thereof, these particular implementations are merely illustrative, and not restrictive. Controls can be provided to allow modifying various parameters of the compositing at the time of performing the recordings. For example, the resolution, number of frames, accuracy of depth position may all be subject to human operator changes or selection.

Any suitable programming language can be used to implement the routines of particular implementations including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular implementations. In some particular implementations, multiple steps shown as sequential in this specification can be performed at the same time.

Some implementations may be implemented as a system that includes one or more processors and logic encoded in one or more non-transitory computer-readable storage media for execution by the one or more processors. The logic when executed are operable to cause the one or more processors to perform implementations described herein.

Some implementations may be implemented as a system that includes one or more processors and a non-transitory storage medium storing processor-readable instructions. The processor-readable instructions when executed by the one or more processors of the system cause the system to carry out implementations described herein.

Some implementations may be implemented as a non-transitory computer-readable storage medium storing computer-readable code. The computer-readable code when executed by one or more processors of a computer cause the computer to carry out implementations described herein.

Some implementations may be implemented as a non-transitory computer-readable storage medium with program instructions stored thereon. The program instructions when executed by one or more processors are operable to cause the one or more processors to perform implementations described herein.

Some implementations may be implemented as a non-transitory computer-readable storage medium for use by or in connection with a instruction execution system, apparatus, system, or device. Particular implementations can be implemented in the form of control logic in software or hardware or a combination of both. The control logic, when executed by one or more processors, may be operable to perform that which is described in particular implementations.

Some implementations may be implemented as a non-transitory processor-readable storage medium including instructions executable by one or more digital processors. The instructions when executed by the one or more digital processors perform implementations described herein.

Some implementations may be implemented as a carrier medium carrying computer-readable code. When executed by one or more processors of a computer, the computer-readable code causes the computer to carry out implementations described herein.

Some implementations may be implemented as processor-implementable code provided on a computer-readable medium. The computer-readable medium may include a non-transient storage medium, such as solid-state memory, a magnetic disk, optical disk, etc., or a transient medium such as a signal transmitted over a computer network. The processor-implementable code when executed by one or more processors of a computer causes the computer to carry out implementations described herein.

Particular implementations may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular implementations can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

We claim:

1. An apparatus for calibrating cameras in a live action scene, the apparatus comprising:
   a base, wherein the base is configured to removably couple to a camera in the live action scene;
   a plurality of extensions coupled to the base, wherein the plurality of extensions extends outwardly away from the base; and
   a plurality of reference points identifiable by a sensor, wherein the reference points are coupled to ends of corresponding extensions of the plurality of extensions, wherein the plurality of extensions positions the plurality of reference points in a three-dimensional arrangement, wherein distances between pairs of reference points are based on one or more aspects of the extensions, and wherein the distances between the pairs of reference points are used to compute reference point data generated from a performance capture system.

2. The apparatus of claim 1, wherein the one or more aspects of the extensions comprises length.

3. The apparatus of claim 1, wherein the distances between pairs of reference points are based on lengths of the extensions coupled to pairs of reference points.

4. The apparatus of claim 1, wherein the distances between pairs of reference points are based on relative angles of the extensions coupled to pairs of reference points.

5. The apparatus of claim 1, wherein the distances between pairs of reference points are changeable.

6. The apparatus of claim 1, wherein one or more of the extensions are removably coupled to the base, wherein a distance between at least one pair of reference points is changeable based on replacing a first extension coupled to at least a first reference point of the at least one pair of reference points with a substitute extension, and wherein a length of the first extension is different from the substitute extension.

7. The apparatus of claim 1, wherein the reference point data is used to compute a location and orientation of one or more cameras in the live action scene.

8. An system for calibrating cameras in a live action scene, the system comprising:
   a base, wherein the base is configured to removably couple to a camera in the live action scene;
   a plurality of extensions coupled to the base, wherein the plurality of extensions extends outwardly away from the base; and
   a plurality of reference points identifiable by a sensor, wherein the reference points are coupled to ends of corresponding extensions of the plurality of extensions, wherein the plurality of extensions positions the plurality of reference points in a three-dimensional arrangement, wherein distances between pairs of reference points are based on one or more aspects of the extensions, and wherein the distances between the pairs of reference points are used to compute reference point data generated from a performance capture system.

9. The system of claim 8, wherein the one or more aspects of the extensions comprise length.

10. The system of claim 8, wherein the distances between pairs of reference points are based on lengths of the extensions coupled to pairs of reference points.

11. The system of claim 8, wherein the distances between pairs of reference points are based on relative angles of the extensions coupled to pairs of reference points.

12. The system of claim 8, wherein the distances between pairs of reference points are changeable.

13. The system of claim 8, wherein one or more of the extensions are removably coupled to the base, wherein a distance between at least one pair of reference points is changeable based on replacing a first extension coupled to at least a first reference point of the at least one pair of reference points with a substitute extension, and wherein a length of the first extension is different from the substitute extension.

14. The system of claim 8, wherein the reference point data is used to compute a location and orientation of one or more cameras in the live action scene.

15. A computer-implemented method for calibrating cameras in a live action scene, the method comprising:
    receiving images of the live action scene from a plurality of cameras;
    receiving reference point data generated from a performance capture system, wherein the reference point data is based on a plurality of reference points identifiable by a sensor, wherein the plurality of reference points are coupled to a plurality of extensions coupled to a base, wherein the base is configured to removably couple to a camera in the live action scene, wherein the plurality of extensions extends outwardly away from the base, wherein the reference points are coupled to ends of corresponding extensions of the plurality of extensions, wherein the plurality of extensions positions the plurality of reference points in a three-dimensional arrangement, and wherein distances between pairs of reference points are based on one or more aspects of the extensions; and
    computing a location and orientation of one or more cameras in the live action scene based on the reference point data.

16. The method of claim 15, wherein the one or more aspects of the extensions comprise length.

17. The method of claim 15, wherein the distances between pairs of reference points are based on lengths of the extensions coupled to pairs of reference points.

18. The method of claim 15, wherein the distances between pairs of reference points are based on relative angles of the extensions coupled to pairs of reference points.

19. The method of claim 15, wherein the distances between pairs of reference points are changeable.

20. The method of claim 15, wherein one or more of the extensions are removably coupled to the base, wherein a distance between at least one pair of reference points is changeable based on replacing a first extension coupled to at least a first reference point of the at least one pair of reference points with a substitute extension, and wherein a length of the first extension is different from the substitute extension.

* * * * *